(12) United States Patent
Morchon

(10) Patent No.: US 12,712,712 B2
(45) Date of Patent: Aug. 18, 2026

(54) METHOD AND DEVICE FOR DISTRIBUTING A MULTICAST ENCRYPTION KEY

(71) Applicant: KONINKLIJKE PHILIPS N.V., Eindhoven (NL)

(72) Inventor: Oscar Garcia Morchon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 471 days.

(21) Appl. No.: 18/033,086

(22) PCT Filed: Oct. 29, 2021

(86) PCT No.: PCT/EP2021/080070
§ 371 (c)(1),
(2) Date: Apr. 21, 2023

(87) PCT Pub. No.: WO2022/090435
PCT Pub. Date: May 5, 2022

(65) Prior Publication Data

US 2024/0015008 A1 Jan. 11, 2024

(30) Foreign Application Priority Data

Oct. 30, 2020 (EP) ..................................... 20205037
Feb. 19, 2021 (EP) ..................................... 21158263
(Continued)

(51) Int. Cl.
*H04L 9/08* (2006.01)

(52) U.S. Cl.
CPC ............ *H04L 9/0833* (2013.01); *H04L 9/088* (2013.01)

(58) Field of Classification Search
CPC ..... H04L 9/0833; H04L 9/088; H04L 9/0822; H04L 9/0891; H04L 2209/80;
(Continued)

(56) References Cited

U.S. PATENT DOCUMENTS

2009/0060189 A1* 3/2009 Osajima ................ H04L 9/0833 380/279
2014/0140511 A1* 5/2014 Suh ....................... H04L 9/0891 380/273
(Continued)

OTHER PUBLICATIONS

"Text proposal for MBMS re-keying based on LKH principles". Samsung Electronics. 3GPP TSG SA WG3 Security—S3#26, Feb. 25-28, 2003.

(Continued)

*Primary Examiner* — Han Yang

(57) ABSTRACT

The present invention relates to a method for a primary station distributing an encryption key to a plurality of secondary stations. The method comprises the steps of determining whether a group key needs to be updated, said group key being used for multicast encrypted communication from the primary station to the plurality of secondary stations, upon determining that an update is required, transmit to at least one first subset of the secondary stations through an encrypted unicast message a first set key by uni-cast, transmitting in a multicast message to the first set of the secondary stations an updated group key, said multicast message being encrypted by means of the first set key, or alternatively including said updated group key in the encrypted unicast message carrying the first step key, transmitting in respective multicast messages to further respective sets of secondary station the updated group key, said multicast messages being encrypted by means of respective set keys associated with each corresponding set.

21 Claims, 13 Drawing Sheets

(30) Foreign Application Priority Data

Feb. 25, 2021 (EP) .................................... 21159158
Mar. 3, 2021 (EP) .................................... 21160538
Aug. 19, 2021 (EP) .................................... 21192250

(58) Field of Classification Search
CPC ... H04L 12/189; H04L 63/062; H04L 63/065; H04N 21/63345; H04N 21/6405; H04W 12/04; H04W 12/041; H04W 12/0431
See application file for complete search history.

(56) References Cited

U.S. PATENT DOCUMENTS

2014/0149745 A1* 5/2014 Suh ...................... H04L 9/3073
713/171
2019/0356480 A1* 11/2019 Hyun ........................ H04L 9/14
2020/0195425 A1* 6/2020 Mistry ................. H04L 63/123

OTHER PUBLICATIONS

3GPP TE 33.246 Technical Specification "Technical Specification Group Services.."
TR 33.850 v0.2.0 3rd Generation Partnership Project: Technical Specification Group Services . . . (Sep. 2020).
TR 23.757 v1.0.0 3rd Generation Partnership Project: Technical Specification Group Services . . . (Sep. 2020).
International Search Report and Written Opinion from PCT/EP2021/080070 mailed Jan. 25, 2022.

* cited by examiner

*Note 1)* SRTP is used for streaming and modified DCF format for download

*Note 2)* Ks_xx_NAF stands for GBA_ME or GBA_U based NAF keys

*Note 3)* Not applicable for GBA_U, since MRK=Ks_ext_NAF

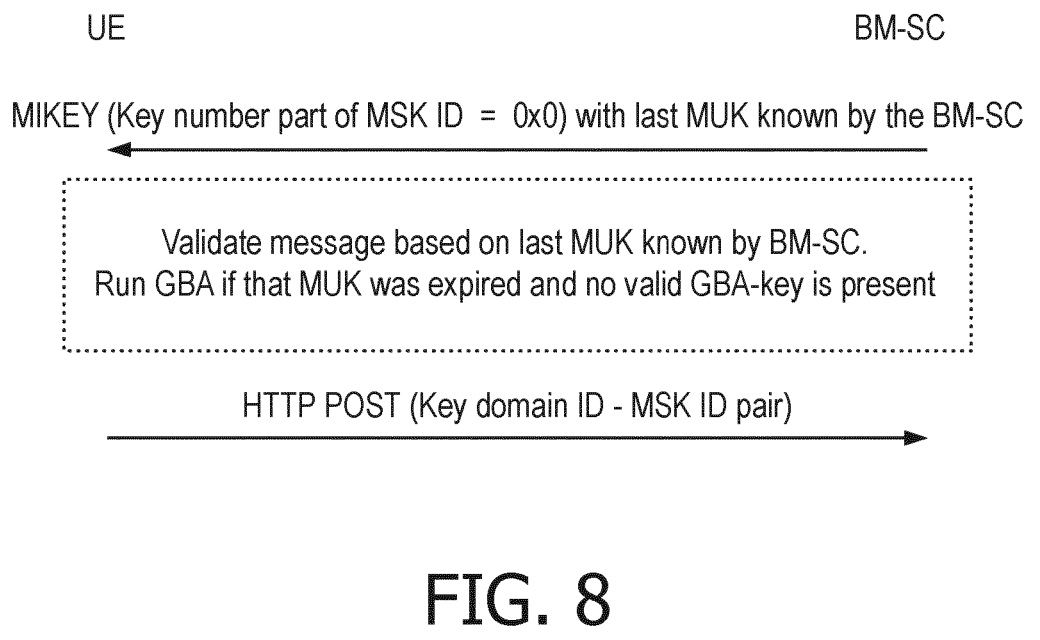

UE

BM-SC

MIKEY (Key number part of MSK ID = 0x0) with last MUK known by the BM-SC

Validate message based on last MUK known by BM-SC.
Run GBA if that MUK was expired and no valid GBA-key is present HTTP POST (Key domain ID - MSK ID pair)

FIG. 8

METHOD AND DEVICE FOR DISTRIBUTING A MULTICAST ENCRYPTION KEY

CROSS REFERENCE TO RELATED APPLICATIONS

This application is a U.S. national phase application of International Application No. PCT/EP2021/080070 filed on Oct. 29, 2021, which claims the benefit of EP application Ser. No. 20/205,037.3 filed on Oct. 30, 2020, EP application Ser. No. 21/158,263.0 filed on Feb. 19, 2021, EP application Ser. No. 21/159,158.1 filed on Feb. 25, 2021, EP application Ser. No. 21/160,538.1 filed on Mar. 3, 2021 and EP application Ser. No. 21/192,250.5 filed on Aug. 19, 2021 and are incorporated herein by reference.

FIELD OF THE INVENTION

The present invention relates to the field of wireless communications, and in particular to security aspects of the communication between a primary station, e.g. a base station, and at least one secondary station, e.g. a terminal or a mobile station forming a network. Other entities may be present in such a network, such as a security entity.

BACKGROUND OF THE INVENTION

In wireless networks, terminals connect to the network in order to exchange data. Security is crucial in particular for wireless devices where a physical interaction is not required to access the network. Also, encryption allows to control access to resources such as multimedia flows. Wireless networks must thus implement some measures to be able to exclude devices that are not authorized in the network. 3GPP is the organization in charge of the standardization of global solutions for mobile telecommunication systems. The telecommunication systems being developed in the 3GPP partnership are no exception. In particular, in 5G, security measures are under discussions to reinforce the security of the network.

5G Multicast Broadcast Services (5MBS) allows subscribers to get access to data streams, in particular multimedia data streams. A typical application is the streaming of video and further information during live events, as live event in stadium (sports, concerts) such as replay videos or additional information or enhanced performance. An important aspect is to make sure that all the subscribers but only the subscribers can get access to the services. Thus, the streams are encrypted by means of a group encryption key which is shared between all users' terminals.

Different issues have however been found with respect to the currently proposed solutions. As part of the background, the following is summarized:

Background 1: 5MBS communication architecture for 5G, r17

Background 2: 5MBS current security key issues and solutions

Background 3: MBMS security architecture for 5G, r16.

Background 1: 5MBS Communication Architecture for 5G, r17

TR 23.757 v1.0.1 (referenced hereafter as [1]) describes a study on architectural enhancements for 5G multicast-broadcast services (in short, 5MBS) for 5G (Release 17). In Section 4 of [1], the architectural assumptions and principles are described, and the following text below is adapted from Section 4:

First, 5MBS applies the following common architectural requirements and principles:

Solutions shall build on the 5G System architectural principles as in TS 23.501 (referenced hereafter as [2]), including flexibility and modularity for newly introduced functionalities.

The system shall provide an efficient transport for a variety of multicast and broadcast services.

Solutions shall minimize impact to existing external services

Architecture reference models defined in TS 23.501 [2] clause 4.2 are used as the baseline architecture for supporting multicast and broadcast services in this study. In particular, FIG. 1 shows the High Level MBS architecture with 5G UE, NG-RAN and 5GC.

Furthermore, there are some specific requirements to Internet Protocol Television (IPTV):

Solutions to IPTV shall minimize the impact to IPTV network and Set-up box (STB).

Solutions to IPTV STB shall reuse IGMP/MLD message via user plane to join/leave an IPTV channel group.

Solutions to IPTV shall provide an efficient mechanism for the UE to join/leave an IP channel group, including reducing latency and signalling.

The sequence to establish and deliver an MBS session is assumed as follows:

1. Optional delivery of 5G MBS service info from application/service layer to 5GC. It is noted that a framework to deliver 5G MBS service info to 5G CN (Core Network) is available. However, this step may be replaced by pre-agreements without explicit signalling.
2. UEs participate in receiving MBS flow i.e. UE requests to join an MBS session (for Multicast session).
3. Establishment of MBS flow transport. It is noted that this step may happen before step 2 for individual UEs joining an MBS session which is already started.
4. MBS data delivery to UEs.
5. UEs stop receiving MBS flow (for Multicast session).
6. Release of MBS flow transport (what used to be session stop).

MBS traffic needs to be delivered from a single data source (Application Service Provider) to multiple UEs. Depending on many factors, multiple delivery methods may be used to deliver MBS traffic in the 5GS. For clarity, delivery methods are not referred to as unicast/multicast/broadcast but as described below.

From the view point of 5G CN, two delivery methods are possible:

5GC Individual MBS traffic delivery method: 5G CN receives a single copy of MBS data packets and delivers separate copies of those MBS data packets to individual UEs via per-UE PDU sessions.

5GC Shared MBS traffic delivery method: 5G CN receives a single copy of MBS data packets and delivers a single copy of those MBS packets packet to a RAN node, which then delivers them to one or multiple UEs If 5GC Individual MBS traffic delivery method is supported, a same received single copy of MBS data packets by the CN may be delivered via both 5GC Individual MBS traffic delivery method for some UE(s) and 5GC Shared MBS traffic delivery method for other UEs.

From the viewpoint of RAN, (in the case of the shared delivery) two delivery methods are available for the transmission of MBS packet flows over radio:

Point-to-Point (PTP) delivery method: a RAN node delivers separate copies of MBS data packet over radio to individual UE.

Point-to-Multipoint (PTM) delivery method: a RAN node delivers a single copy of MBS data packets over radio to a set of UEs.

Here, it is noted that a RAN node may use a combination of PTP/PTM to deliver an MBS packet to UEs. As depicted in FIG. 2, Shared PTP or PTM delivery method and Individual delivery method may be used at the same time for a 5G MBS session depending on selected solution.

In Annex A.1 of [1], the 5MBS reference architecture alternatives are described. In particular, it is considered the transport-layer and service-layer aspects. This is denoted below with names A.1.1 and A.1.2

A.1.1. Transport-Layer Aspects of the Reference Architecture:

FIG. 3 shows the 5G system architecture for integrated Multicast transport with unicast. The solution relies on enhancing the existing 5GS network functions, NG-RAN and UE currently only supporting unicast transport, to support Multicast transport.

The following new functionality is added to the current AF, 5GC NFs (Network Functions), NG-RAN and UE:

Application function (AF):

Support MBS service functions, negotiation with NEF for service exposure.

Network exposure function (NEF):

5G MBS service exposure.

Negotiation of 5G MBS service with AF, including QoS, 5G MBS service area.

Policy control function (PCF):

Support policies for Multicast services, including QoS parameters like 5QI, MBR, GBR.

Provide policy information regarding the MBS session to SMF.

Receive MBS service information from AF, directly (operator owned) or indirectly via NEF.

Session management function (SMF):

Control of MBS transport, based on received MBS policies from PCF.

Configuration of the User Plane Function (UPF) for MBS flows and for point to point or point-to-multipoint transfer.

Configuration of the RAN for MBS flows and QoS information.

SM configuration at the UE for MBS flows.

An SMF may be used for both unicast and MBS.

User Plane Function (UPF):

Support of packet filtering of MBS flows, and delivery of MBS flows to RAN via point to point or point-to-multipoint N3.

Receive 5G MBS flow configuration from SMF.

Detection of Internet Group Management Protocol (IGMP) packets and notification to SMF. (If UE joining is performed via IGMP).

A UPF may receive both unicast and MBS flows.

I-UPF(s) may be used for the delivery of MBS flows from the UPF attached to N6 to NG-RAN; the N9 interface can be used for MBS traffic delivery.

NG-RAN:

Reception of MBS flows via N3 and delivery over-the-air.

Switch between multicast and unicast delivery of MBS flows.

UEs configuration for MBS flow reception at AS layer.

UE:

Support of UE policy configuration extension to MBS.

Support of SM extension for MBS flows.

Signalling for joining MBS flow (via SM signalling or user plane IGMP Join).

MBS support at AS layer.

A.1.2 Service layer aspects for the reference architecture: Orthogonal to the description of the multicast flow user plane model at the transport layer, a service layer can be supported on top. The service layer is fully separate from the Multicast transport. This allows for applications that do not require a service layer to establish a multicast transport directly via Nnef (control plane and N6 (user plane data).

FIG. 4 shows an example for service layer support of multicast/broadcast using xMB/MB2 as entry point. A new Network Function, called Multicast Service Function (MSF) is introduced. The MSF provides only Service layer functionality and requests the 5G system (via Npcf or Nnef) for the underlying Multicast transport necessary for the Multicast service. The MSF has the following functionality:

Entry point for both control plane service layer signalling and user plane data, e.g. xMB/MB2. Interaction can happen directly with external AF or via NEF.

MSF Control Plane (MSF-C):

Multicast service configuration.

MBS service level management.

xMB-C/MB2-C termination.

Codec configuration (if needed).

MSF User Plane (MSF-U):

xMB-U/MB2-U termination.

Encoding of data at service layer.

Multicast service layer data packets delivery via N6.

If an application does not need any specific service layer functionality, the application may use:

Nnef directly for multicast session configuration/negotiation and

N6 for multicast data delivery

This is shown in FIG. 5, which depicts an exemplary MBS system with direct Application Server/Function interaction.

In annex A.2 in [1], the 5G MBS system architecture based on dedicated MBS function is described.

To support MBS in 5GS user service delivery, two variants modes of operation exist: one for Transport Only Mode, and the other for Full Service Mode (TS 23.246 clause 7.5).

For the Transport Only Mode, the MBS application data are transparent to network function in FIG. 6.

For the Full Service Mode, the MBSF/MBSU is aware of the content stream and is capable of transforming the content stream into 3GPP compliant stream.

FIG. 6 illustrates a single exemplary architecture for MBS in 5GS. In this FIG. 6, the SMF and UPF which have the roles to support MB Sessions are named "MB-SMF" and "MB-UPF". Nothing prevents the MB-SMF and MB-UPF to simultaneously support both PDU Sessions and MB Sessions, e.g. PDU Sessions and MB Sessions to the same DNN. However, MB-SMF and MB-UPF can also be deployed and configured to exclusively handle MB Sessions. It is believed it may reduce signalling and in some cases be simpler and more cost efficient to operate a limited number of MB-SMFs and MB-UPFs dedicated to MBS. This architecture makes that possible if preferred.

Enhancement to existing entities and new functional components are as follows:

UE, NG-RAN, AMF, SMF, UPF, NEF and PCF support MBS.

UEs support 5G MBS services.

NG-RAN supports Point-to-Multipoint (PTM) and Point-to-Point (PTP) delivery of MBS media. NG-RAN independently controls switching between PTM and PTP for best service quality and resource efficiency.

AMF is enhanced to select MB-SMF and be part of the signalling distribution tree.

MB-SMF is an SMF enhanced to control MB Sessions, signalling with AF (via NEF/MBSF), QoS control using PCF, and provision of MB Session information on request from AMF. The PDU session(s) the UE(s) maintain for individual delivery of an MBS service may be associated with the MB Session managed by the MB-SMF.

MB-UPF is a UPF enhanced with an MBS user plane function.

MBSF (Multicast/Broadcast Service Function) is a function which may be part of NEF or be deployed independently. The MBSF may support TMGI allocation or other MBS signalling for the the service level management. The MBSF also provides an interface to the Application Function or content provider and it has an interface to the MBSU. MBSF may perform authorization of the UE to join the MB session.

MBSU (Multicast/Broadcast Service User plane) is a new entity to handle the payload part to cater for the service level functions and management.

NEF is an existing NF, which provides interface to the AF.

PCF is enhanced to handle QoS for MB Sessions, e.g. to authorize the QoS profiles for shared delivery.

Enhancement to existing interfaces and new interfaces are as follows:

N2 interface controls MB Sessions including management of the shared N3 tunnel between MB-UPF and NG-RAN(s).

N3 interface supports shared N3 tunnel between MB-UPF and NG-RAN.

N4 interface manages the shared N3 tunnel between MB-UPF and NG-RAN(s) including establishment of the shared N3 tunnel.

N7 and N30 interfaces are capable of policy control of MB Sessions.

N11 interface is enhanced with MBS control signalling including management of the shared N3 tunnel between MB-UPF and NG-RAN(s).

N29 interface is enhanced with MBS control signalling.

N33 interface is enhanced with MBS control signalling.

Ny: new interface between the MBSF and MBSU to manage the MBSU functions.

NxMB-U new interface between the new MBSU and AF for MBS user plane traffic.

Following these architectures, multiple possible solutions are listed in [1]. For instance, Solution #2 in [1] assumes a 5G MBS system architecture based on dedicated MBS function. FIG. 6.2.2.2a-1 describes session start with 5GC individual MBS traffic delivery (i.e., with PUD sessions to UEs). FIG. 6.2.2.2-1 describes the session start for an MBS session. It is relevant to see that the AF delivers media stream to the MB-UPF that sends its further down the network.

Background 2: 5MBS Current Security Key Issues and Solutions

Based on the above overall architecture for 5MBS [1], it is currently being studied how to protect the 5MBS system. This is reflected in TR33.850 v0.2.0 (Study on Security Aspects of Enhancements for 5G Multicast-Broadcast Services) [2]. Currently there are three key issues that need to be solved:

Key Issue #1: The 5GS shall support the authentication and authorization for multicast communication service. In particular, this key issue refers to the reference architectures in [1] that have been summarized above and key issue #3 in [1] that includes two aspects: (i) Define and study how to support the necessary level(s) of authorization for UEs to access multicast communication services; (ii) How can a UE join/leave (including authorised or revoked to access) a multicast communication service?

Key Issue #2: The 5GS shall support the confidentiality protection, integrity protection, and anti-replay protection of MBS traffic.

Key Issue #3: The distribution of the keys for protection of MBS traffic between the key generator and the UE shall be confidentiality, integrity and anti-replay protected.

In [2], there are three solutions for KI#2 and KI#3. These solutions are solutions #1, #2 and #3.

Solution #1 focuses on the protection of MBS traffic at the transport layer. In this case, a group key is used at PDCP level and generated in the RAN. This group key is used to protect the MBS traffic.

Solution #2 focuses on protecting the MBS traffic at the service layer. A group key is generated at the (MB)-SMF. This key is securely sent to each UE with MUK, a key derived from Kausf. The group key is used to protect the MBS traffic.

Solution #3 focuses on protecting the MBS traffic with a multicast transport key (MTK) generated in the core network and that is distributed to the UEs in a secure (unicast) manner. This MTK is used to protect the MBS traffic.

Background 3: MBMS Security Architecture for 5G, r16

Relevant to the description of an invention in 5MBS is how security is realized in 4G for MBMS. The security architecture for MBMS is described in TS 33.246 [3]. Next, we summarize the most important aspects:

Annex B describes the security threats that are considered. B.1 are threats in the radio interface. B.1.1 describes, among others, “Unauthorized access to MBMS user service data” and includes as threats that intruders might eavesdrop on MBMS user service data, users that have joined and left a MBMS user service continuing to receive the service without being charge, and subscribers deriving decryption keys and distributing them to unauthorized parties. B.1.2 describes “Threats to integrity” including modifications and replay of messages in a way to fool the user of the content from the actual source.

Annex C describes security requirements. In particular, C.4 describes requirements on MBMS key management including that “The UE and MBMS key generator shall support the operator to perform re-keying as frequently as it believes necessary to ensure that: 1) users that have joined an MBMS User Service, but then left, shall not gain further access to the MBMS User Service without being charged appropriately; 2) users joining an MBMS User Service shall not gain access to data from previous transmissions in the MBMS User Service without having been charged appropriately and 3) the effect of subscribed users distributing decryption keys to non-subscribed users shall be controllable".

FIG. 7 (corresponding to FIG. 4.1 in [3]) describes the overall MBMS security architecture. From the Itectec webpage (available at itectec.com (referenced hereafter as [4])) a description of key management and security in MBMS based on [3] is included. According to [4] and section 4.2 in [3]: "The BM-SC controls the use of the MBMS Service Keys (MSKs) to secure the different RTP sessions and FLUTE channels. The MSKs are used to protect the delivery of MBMS Transport Keys (MTKs), which are used to secure the RTP sessions and FLUTE channels as specified within clauses 6.5 and 6.6. The delivery of MSKs is secured with user specific MBMS User Key (MUK), which is received from GBA, cf. clause 6.1. MSKs and MTKs are managed at the MBMS User Service Level. "This means that a UE that has access to a service receives a MSK protected with MUK. MTKs are distributed to multiple UEs protected with the MSK. This is illustrated as follows (where an arrow indicates protected with):

| | | | | |
|---|---|---|---|---|
| MUK | -> | MSK_0 | -> | MTK_00 |
| | | | -> | MTK_01 |
| | | | -> | . . . |
| | -> | MSK_1 | -> | MTK_10 |
| | | | -> | MTK_11 |
| | | | -> | . . . |
| | -> | . . . | | |

Section 6.3.2.2 describes MSK request procedures required by the UE to get a new MSK. This procedure is part of other procedures, e.g., when a UE has missed a key update (out of coverage) or solicited pull procedure by the BM-SC. This last procedure is described in 6.3.2.2.4. and depicted in FIG. 6.2b in [3] and in below FIG. 8. It shows that the BM-SC sends a MIKEY message to the UE, the UE validates it, and if correct, it sends a HTTP POST request to get the MSK update.

MIKEY stands for Multimedia Internet KEYing and it is defined in RFC 3830 (ietf.org). MIKEY was defined in 2004 by Ericsson Research and describes This document describes a key management scheme that can be used for real-time applications (both for peer-to-peer communication and group communication).

Section 6.3.2.3 in [3] describes how the MSKs are delivered to the UEs, in particular, (i) MSK push (Section 6.3.2.3.1) where the MB-SC delivers the key in a MIKEY message over UDP. The UE replies with a MIKEY message over UDP as well.

Section 6.3.3 in [3] describes procedures for MTKs, including their unique ID that depends on the MSK ID. This means that the same MTK cannot be used with two different MSKs. The updates of the MTKs are protected with an MSK and this message can be included in the multicast/broadcast stream.

Annex I shows an example on how traffic is protected. In particular, a same MSK can be used to protect two user services.

Section 6.3.4 describes how to handle "Multiple BM-SC deployments", this is only applicable when the same MBMS user service is transmitted over multiple BM-SCs. If this happens, the keys, both MSKs (Section 6.3.4.4) and MTKs (Section 6.3.4.5), in multiple BM-SCs are the same since they are used with the same traffic. Solutions #1, #2, and #3 in [2] use a single group key to protect the multicast/broadcast traffic. The problem is that if the group key is compromised (e.g., a UE is malicious, or just a UE is removed from the MBS), those solutions do not describe how the group key is updated so that content distributed at a later point of time is not obtained or modified. In particular, if the group key cannot be updated, then an attacker:

a) Can still have access to content, e.g., by passively monitoring the communication.

b) can inject traffic, e.g., in the context of a MitM attack.

Similarly, [3] describes the security architecture for MBMS (r16) where individual device keys (MUKs) are used to deliver Multicast Service Keys (MSK) that are used to protect the Multicast Transport Keys (MTKs) for specific MBMS services. In this case, the group key are equivalent to the MTKs. If a UE is compromised, it is required to update the MSK and MTK. [3] describes how to update the MSK, however, updating it requires lots of signaling since each UE needs to contact the BM-SC to get the new MSK as shown in FIG. 8, which describes a BM-SC solicited pull.

SUMMARY OF THE INVENTION

One aim of the present invention is alleviate the above mentioned problems.

Another aim of the present invention is to ensure that a cryptographic key is updated efficiently.

Still another aim of this invention is to reduce the amount of signalling required to reconfigure the system in case of a terminal being compromised or revoked.

Still another aim of the invention is to provide a primary station and secondary stations which can update a shared cryptographic key more efficiently while improving the security of the system.

Thus, it proposed in a first aspect of the invention, a method for a primary station distributing a cryptographic key to a plurality of secondary stations, comprising the steps of a. determining whether a group key needs to be updated, said group key being used for multicast protected communication from the primary station to the plurality of secondary stations, b. upon determining that an update is required, transmit to at least a subset of the secondary stations through an encrypted message an updated cryptographic key.

Thus, in case a group key needs to be updated, the system automatically provides with an updated cryptographic key, making sure that the system is not compromised. It is to be noted that the cryptographic key may correspond to an encryption key used to encrypt data information. In some variants, the cryptographic key may be used for integrity protection, for example to authenticate the origin of messages, or the freshness of messages.

In a variant of the first aspect of the invention, the updated cryptographic key is an updated group key, and wherein the encrypted message is encrypted by means of a user specific encryption key and sent in unicast. Unicast means that the message is addressed to a single target. This corresponds to a point to point message. This can be done for example by using a dedicated channel and/or by identifying the recipient of the message.

In still another variant of the first aspect of the invention, the step of determining whether a group key needs to be updated includes determining whether at least one of the following conditions is satisfied: at least one of the secondary stations' access rights have been revoked, at least one of the secondary stations' access rights have expired, a validity time of the group key has expired, at least one of the secondary stations has moved away from a predetermined location.

In still another variant of the first aspect of the invention, the updated cryptographic key is a first set key shared to a first set of secondary stations.

In accordance with this variant, the secondary stations are grouped in sets. Each of the set includes a number of secondary stations, and they all share the same set cryptographic key. This set cryptographic key or first set key allows to encrypt/protect some multicast messages addressed to secondary stations of the first set. Thus, when updating the group key, the primary station can direct a respective multicast message to each set. This reduces the number of sent messages as these are sent in multicast and no more in unicast to each secondary station. By multicast, this corresponds for example to a single message addressed to a group of secondary stations, for example using a common encryption set key. This can be done by using a broadcast channel for example. In an example of this variant, wherein the first set key is updated upon determination at step a. that the access rights of at least one of the secondary stations belonging to the first set are not currently valid. This means indeed that one of the secondary stations of the first set is compromised or has been revoked. Thus, the first set needs to update its set key to make sure that an attacker cannot access data sent to the first set.

Once this first set key has been updated, an updated group key can be sent by multicast to each set of secondary stations. This corresponds to the step of transmitting an updated group key to each set of secondary stations by means of a message protected with a respective set key associated to each set of secondary stations.

It is to be noted that in some cases, e.g. in the case of a secondary station joining for first time, or if the number of stations in the set is low, this message may be transmitted in unicast instead. Further, it is possible to send the message twice, once in unicast, once in multicast in some particular case.

It is to be noted that the first set key may be used to encrypt and/or to protect the integrity and/or to protect the freshness of the messages sent to the set of secondary stations.

In accordance with a second aspect of the invention, it is proposed a method for a primary station distributing a cryptographic key to a plurality of secondary stations, comprising the steps of a. determining whether a group key needs to be updated, said group key being used for protected multicast communication from the primary station to the plurality of secondary stations,
b. upon determining that an update is required, transmitting in respective multicast messages to respective sets of secondary station an updated group key, said multicast messages being protected by means of respective set keys associated with each corresponding set.

Similarly to what was explained earlier, in accordance with this second aspect of the invention, the secondary stations are grouped in sets. Each of the set includes a number of secondary stations, and they all share the same set cryptographic key. This set cryptographic key or first set key allows to encrypt/protect some multicast messages addressed to secondary stations of the first set. Thus, when updating the group key, the primary station can direct a respective multicast message to each set. This reduces dramatically the number of sent messages as these are sent in multicast and no more in unicast to each secondary station. By multicast, this corresponds for example to a single message addressed to a group of secondary stations, for example using a common encryption set key. This can be done by using a broadcast channel for example. In an example of this variant, wherein the first set key is updated upon determination at step a. that the access rights of at least one of the secondary stations belonging to the first set are not currently valid. This means indeed that one of the secondary stations of the first set is compromised or has been revoked. Thus, the first set needs to update its set key to make sure that an attacker cannot access data sent to the first set.

In this second aspect of the invention, the step of determining whether a group key needs to be updated includes determining whether at least one of the following conditions is satisfied:

- at least one of the secondary stations' access rights have been revoked,
- at least one of the secondary stations' access rights have expired,
- a validity time of the group key has expired,
- at least one of the secondary stations has moved away from a predetermined location.

If the need to update is linked an issue of access rights with one of the stations, it is likely that the set key will need to be updated as well. As an example, the method comprises, if at step a. the determination that the group key is linked to access rights of a first secondary station belonging to a first set of secondary stations not being valid, transmit to each secondary stations of said first set through a protected unicast message a new first set key by unicast.

Once this update of the first key is done for the first set, the secondary stations of the first key may receive the updated encryption group key. Thus, the method would further include in such an example, the step c. of transmitting in a multicast message to the first set of the secondary stations an updated group key, said multicast message being encrypted by means of the new first set key. This is similar to the other sets but these did not require an update of the set key. Thus, the number of messages required for the update is reduced for all the secondary stations of the other sets.

In a different example, the group key may be updated by means of the same unicast message used for the new first set key. Thus, the protected unicast message also includes the updated group key. This allows to avoid the transmission of a new multicast message to the first set thus reducing further the amount of messages being sent out during a group key update.

In a third aspect of the invention, it is proposed a method for a primary station distributing a cryptographic key to a plurality of secondary stations, comprising the steps of a. determining whether a group key needs to be updated, said group key being used for protected multicast communication from the primary station to the plurality of secondary stations,
b. upon determining that an update is required, transmit to at least one first subset of the secondary stations through a protected unicast message a first set key by unicast,
c. transmitting in a multicast message to the first set of the secondary stations an updated group key, said multicast message being protected by means of the first set key, or alternatively including said updated group key in the protected unicast message of step b.,
d. transmitting in respective multicast messages to further respective sets of secondary station the updated group key, said multicast messages being protected by means of respective set keys associated with each corresponding set.

It is to be noted that the primary station may be a base station, e.g. an eNodeB (eNB) in LTE or a gNodeB (gNB) in 5G. However, the primary station may correspond to a higher level entity of the network, for example a Core Network element or a Trust Centre of the network. In such cases, the steps relative to transmission to the secondary station includes the indirect transmission of the messages through different interfaces (optical fiber, Ethernet, air interface) and through different entities including a base station or a relay for example. It might not be directly from the primary station is such a case. The message delivering the cryptographic key might be originated by a given 5G network function within the core network, but that network function might give it to another entity in the core network in charge of transmitting the 5MBS traffic.

In a variant of the second or third aspects of the invention, the sets of secondary stations are formed based on location, and wherein step d. further comprises the primary station transmitting in at least one further multicast message the updated group key, said further multicast message being encrypted by means of a respective set key used in a neighbouring set. In an example, a neighbouring set is a set of a plurality of secondary stations camping in a cell served by another primary station. It can for example be a set of secondary stations served in adjacent cell. These may be served by the same primary station or a different primary station. This allows for the secondary stations some mobility while not risking to miss an update of the group key because a secondary station moved away from its original cell. To improve further on this reliability, and reducing the risk for a secondary station to miss the updated key, the multicast messages may be retransmitted periodically.

In a different example of these aspects however, the sets may be formed in a more randomly manner, for example based on an identifier of the secondary stations or based on a connection time.

In still another variant of these aspects of the invention, the multicast message includes along with the updated group key an authentication fingerprint message computed as the hash of updated group key.

In accordance with a fourth aspect of the invention, it is proposed a method for a secondary station receiving a cryptographic key in a network, comprising the steps of a. receiving from the primary station through protected unicast message a first set key by unicast, said first key being associated with a first set of secondary stations,
b. receiving and decrypting a multicast message to the first set of the secondary stations an updated group key, said decrypting using the first set key.

In a variant of the fourth aspect of the invention, it is proposed that the multicast message includes along with the protected updated group key an authentication fingerprint message, and the method further comprising the secondary station authenticating the multicast message by checking whether the hash of the decrypted group key matches the received authentication fingerprint. Thus, it allows for all the secondary stations to report any discrepancy should an attacker try to impersonate the primary station and send out fake messages. Thus, it can be proposed to reporting an anomaly to the primary station if the check fails.

In accordance with a fifth aspect of the invention it is proposed a primary station operating in a cellular network and communicating with a plurality of secondary stations, comprising a controller adapted to determine whether a group key needs to be updated, said group key being used for protected multicast communication from the primary station to the plurality of secondary stations,
a transmitter coupled to the controller adapted to, upon determining that an update is required, transmit in respective multicast messages to respective sets of secondary station an updated group key, said multicast messages being protected by means of respective set keys associated with each corresponding set.

It is to be noted that the primary station may be a base station, e.g. an eNodeB in LTE or a gNodeB in 5G. However, the primary station may correspond to a higher level entity of the network, for example a Core Network element or a Trust Centre of the network. In such cases, the steps relative to transmission to the secondary station includes the indirect transmission of the messages through different interfaces (optical fiber, Ethernet, air interface) and through different entities including a base station or a relay for example. It might not be directly from the primary station is such a case. The message delivering the cryptographic key might be originated by a given 5G network function witthin the core network, but that network function might give it to another entity in the core network in charge of transmitting the 5MBS traffic.

Thus, the primary station may update the group key to all the secondary stations in a more efficient way as many multicast messages can be used instead of conventional unicast messages.

In accordance with a sixth aspect of the invention, it is proposed a secondary station operating in a cellular network and communicating with a primary station, comprising a receiver adapted to receiving from the primary station through a protected unicast message a first set key by unicast, said first key being associated with a first set of secondary stations, and a controller adapted to decrypt a multicast message to the first set of the secondary stations an updated group key, said decrypting using the first set key.

It is to be noted that decrypting the multicast message may also be replaced or complemented by an authenticity check and/or a freshness check of the multicast message.

In accordance with a seventh aspect of the invention, it is proposed a program code means of a computer program and/or as dedicated hardware stored and/or distributed on a suitable medium, such as an optical storage medium or a solid-state medium, supplied together with or as part of other hardware, but may also be distributed in other forms, such as via the Internet or other wired or wireless telecommunication systems, and which includes the instructions to perform the method of the first, second third or fourth aspects of the invention.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the claimed methods, and claimed apparatuses (the primary station or the secondary station) may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

FIG. 8, already described, is a diagram illustrating a conventional method for updating the key in the UEs;

DETAILED DESCRIPTION

As seen above, the present invention can be implemented in a cellular network as for example a 4G or a 5G network.

Figure 14:
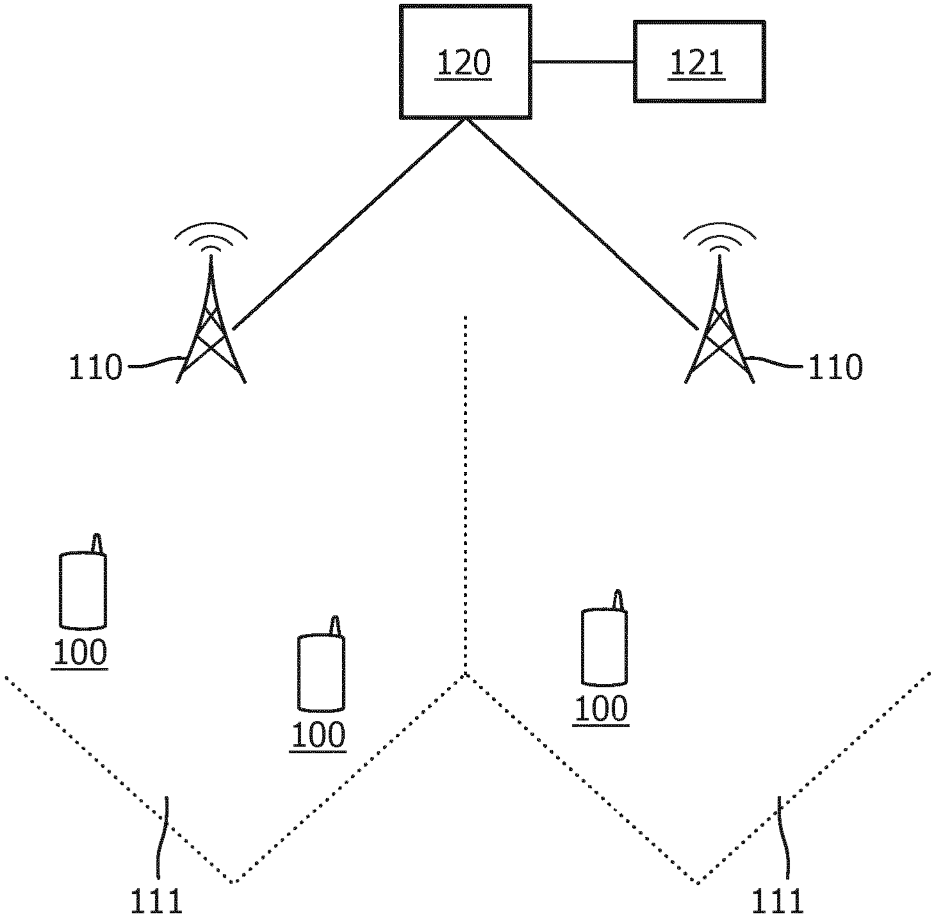
FIG. 14 is a block diagram representing a network in which embodiments of the invention are implemented.

In these telecommunication systems illustrated on FIG. 14, secondary stations 100 act as terminals or end devices (also referred to as User Equipment, UE, in 5G). The secondary station can access different types of services including voice and data services through base stations 110 (also referred to as gNB in 5G) that are deployed in field. Each base station 110 serves and communicates with the secondary stations 100 present in an area, also referred as a cell 111. The base stations are connected to a core network (CN) 120—managed by a network operator—that controls the telecommunications systems and orchestrates the delivery of services.

As seen in relation with FIG. 14, such a cellular network comprises a plurality of terminals or secondary stations 100, being mobile devices (or UEs) that may travel from a network cell to another 111. Each cell 111 is served by a base station 110 (or a gNodeB) which makes the interface between the secondary stations 100 and the Core Network 120.

Therefore, the secondary stations 100 communicate with the base stations 110 on various radio channels, uplink (from the secondary stations to the base station) and downlink (from the base station to the secondary stations). Other radio channels exist, for example between secondary stations (for example Sidelink channels) and between base stations (e.g. X2 interface), but are not represented for the sake of simplicity of FIG. 14. The embodiments of the invention could also be applied to these interfaces however it will be focused in the following parts of the description to the links between the secondary stations and the base stations.

It is to be noted that the various embodiments are implemented between the secondary stations and primary stations. In some embodiments, the primary stations may correspond to some entities of the Core Network 120. The base station may also (partially or completely) operate as primary station in the sense of the embodiments of the invention.

In accordance with a definition of the embodiment of this invention, it is proposed a procedure to update the group key used to protect the multicast/broadcast traffic in Solutions #2 and #3 in [2]. The basic idea consists in generating a new group key and distributing it to the UEs so that the multicast/broadcast content is protected with a new group key. This basic idea makes therefore sure that an attacker cannot access content or inject traffic, but this basic idea has the drawback that it involves a high overhead to distribute the new content key to all "N−1" non-compromised UEs.

The above basic idea is improved in the various following embodiments and examples (extended idea) by defining "M" UE groups, each associated to a key group. A group might be based, e.g., on the location of the UEs. If a UE is compromised, then:

- The content key is updated using the group keys in the M−1 non compromised groups
- The group and content keys are updated with N/M−1 messages towards the UEs in the group corresponding to the compromised UE.

In this way, the signaling overhead is reduced from N−1 to N/M+M−2. For instance, if N=10000, and M=25, then the overhead is reduced from 9999 messages to 63 messages. This extended idea applies to Solutions such as #1, #2 and #3 in [2] and can also be used in [3] to reduce the signaling overhead.

It is to be noted that one difference between this embodiment of the invention and the solution in [3] is that this embodiment allows distributing a same K_group (similar to MTK in [3] and used to protect the multicast/broadcast content) with different K_set keys (similar to MSK in [3] and used to deliver the key group).

```
K_UE   ->   K_set_0   \
       ->   K_set_1   |
       ->             >   ->   K_group
       ->             |
       ->   K_set_M   /
```

A basic embodiment of the invention is detailed in the context of Solution #2 in [2], however, similar a similar approach is applicable to similar solutions in [2] (e.g., Solution #3). This embodiment is also applicable to [3].

BASIC EMBODIMENT

Figure 9:
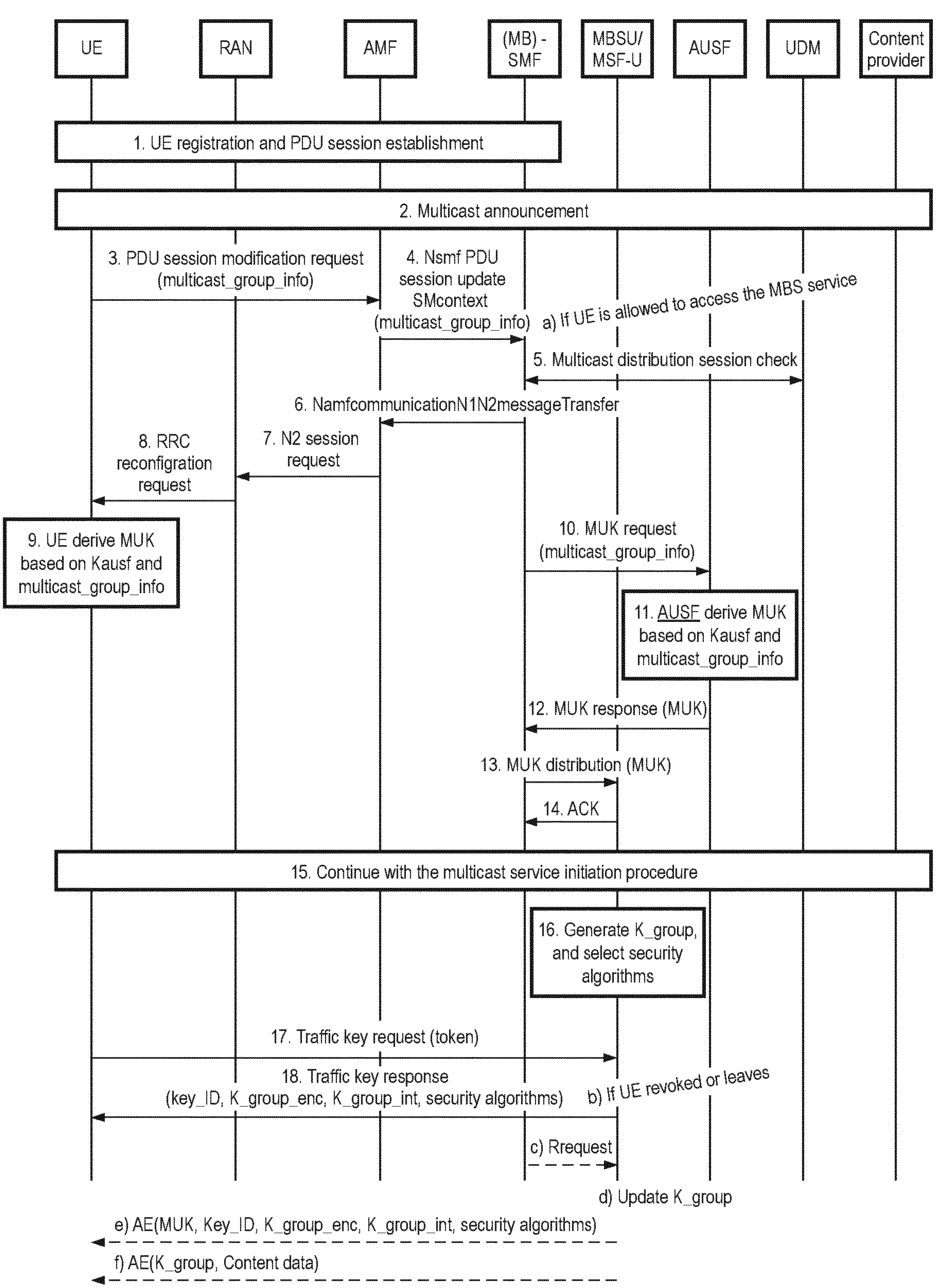
FIG. 9 is a diagram representing a procedure in accordance with a first embodiment of the invention.

FIG. 9 describes the basic procedure proposed in this invention where the alphabetic steps (a-f) are additions applied to the solution of Solution #2 in [2].

a) Checks whether the UE is allowed to join the MBS group.
b) Checks whether the UE access rights have changed, e.g., whether it has been revoked.
c) Sends a request to update the group keys
d) Updates the group keys
e) Sends a unicast message, protected with the MUK, to each non-revoked UE updating K_group_enc and K_group_int. Each UE uses its MUK to verify the authenticity of the message and decrypt the new group key. Freshness also needs to be verified (see embodiment 3 below).
f) The updated group key are used to protect the content data and send it to the UEs. The UEs In FIG. 9, AE stands for Authenticated Encryption meaning that the message is i) authenticated by means of, e.g., a message authentication code (MAC) computed using a key, e.g., a key specific for authentication and integrity protection (K_int) and ii) encrypted using a key, e.g., a key specific for encryption (K_enc). An example of AE is AES in GCM mode.

With this basic solution, it is possible to update k_group and prevent the revoked UE from accessing or modifying the broadcast data. This basic solution requires the exchange of N−1 messages if N UEs are subscribed to a given MBS.

Embodiment 1: Definition of UE Setts and Set Keys

Figure 10:
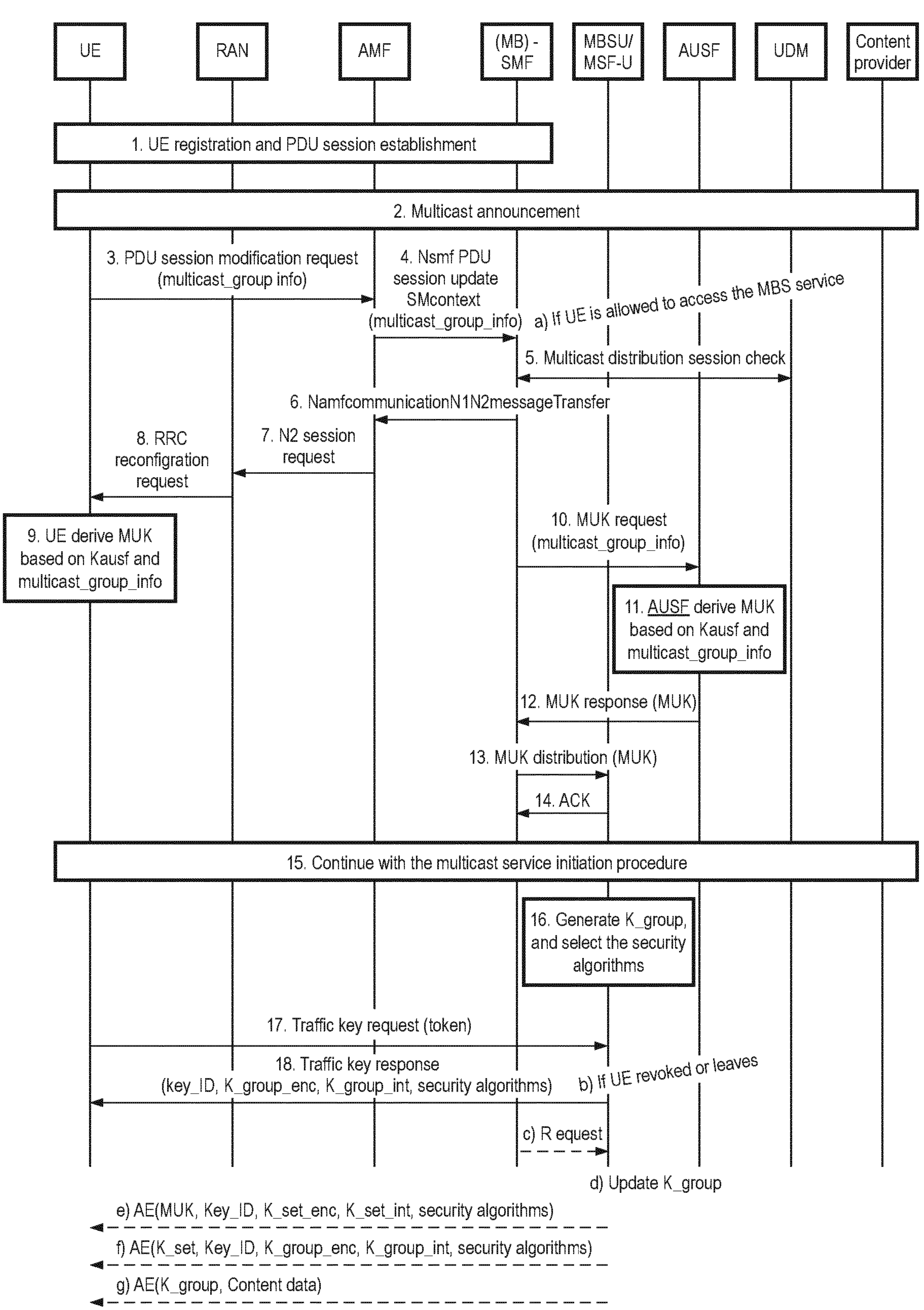
FIG. 10 is a diagram representing a procedure in accordance with a second embodiment of the invention

FIG. 10 describes an improved embodiment from the basic embodiment of the invention where the alphabetic steps (a-i) are additions in applied to the solution of Solution #2 in [2].

a) Checks whether the UE is allowed to join the MBS group.
b) Generates the key K_group to protect the content and M keys K_sets to protect the delivery of K_group where a set refers to a set of M~N/L UEs.
c) Determines in which set a UE is placed.
d) Checks if a UE has been revoked, has left the group, etc.
e) Sends a request to update 1) the group key used to protect the multicast/broadcast content and 2) the set key used to protect the delivery of the group key in the set of devices affected by the UE revocation.
f) The group keys (K_group_enc and K_group_int) are updated. The set keys (K_set_enc and K_set_int) associated to the UE's set are updated.
g) The set keys of the M−1 UEs in the compromised set are updated by means of M−1 point-to-point interactions.
h) The new group keys used to protect the content are updated by sending L messages to the non-affected sets.
i) The updated group key is used to protect the content data and send it to the UEs With this embodiment, it is possible to update k_group and prevent the revoked UE from accessing or modifying the broadcast data. This basic solution requires the exchange of M−1 point to point messages and the delivery of L multicast messages. For instance, if N=1000, M=40 and L=25, then the basic embodiment requires 999 messages while this approach requires 64.

Figure 11:
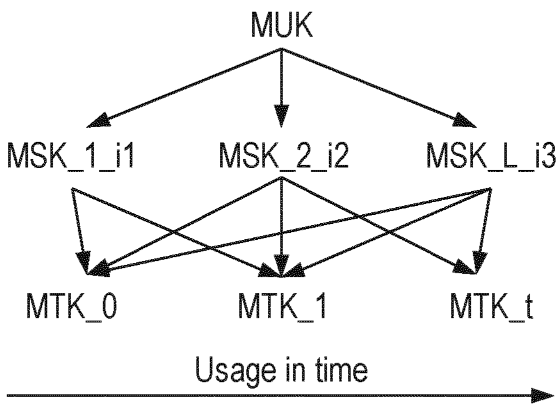
FIG. 11 is a diagram representing a modified key hierarchy in accordance with an embodiment of the invention.

If this embodiment is applied to the solution proposed in [3], then different sets of UEs accessing the same multicast broadcast service are given a different set keys (MSKs). These different set keys are used to protect a same group key (MTK) at a given point of time instead of requiring the unicast communication between UE and MB-BC, the update of group key. This modification changes the key hierarchy in MIKEY used in [3] as illustrated in FIG. 11. The MSKs are defined for a set of users and there are L of them. Each of them can be be updated individually and each of them has a different counter {i1, i2, . . . iL}. If a set key (MSK) is updated, this implies a change of the group key (the MTK). The MTKs have a different counter t to identify them. Even if no set key (MSK) is updated, the group key (MTK) can be updated in a proactive way, e.g., if it has been used for a too long period of time.

Figure 12:
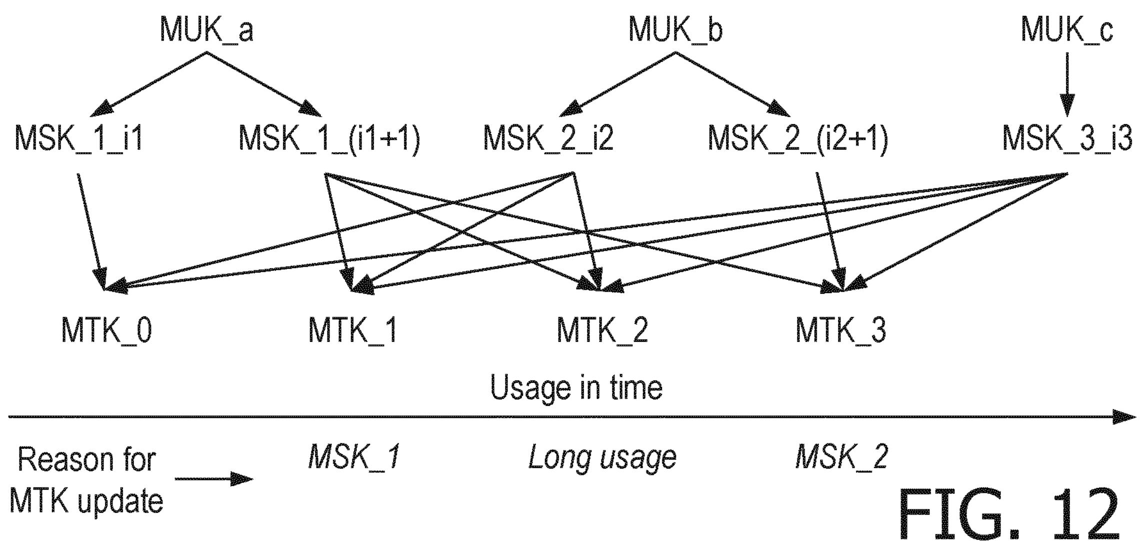
FIG. 12 shows a specific exemplary embodiment of the invention.

FIG. 12 shows a more specific example in which there are three set of devices having set keys identified with MSK_1, MSK_2 and MSK_3. For each set of devices we also have a device, in set of devices 1 we have device a having a device key denoted as MUK_a, in set of devices 2 we have device b having a device key denoted as MUK_b, and in set of devices 3 we have a device c having a device key denoted as MUK_c.

The first group key in usage to protect the content data is denoted as MTK_0.

In this situation, a change occurs in set of devices a, e.g., a device leaves that set of devices. This will trigger an update in MSK_1_i1 to MSK_1_(i1+1), i.e., the set key changes and its index increases. Since the group key MTK_0 might be compromised, a new MTK_1 is distributed in a secure way to the devices in the different sets using MSK_1_(i1+1), MSK_2_i2, and MSK_3_i3.

In this situation, MTK_1 is used for a long period of time. This triggers the update to MTK_2 that is securely distributed using MSK_1_(i1+1), MSK_2_i2, and MSK_3_i3.

In this situation, a change occurs in set of devices b, e.g., a device leaves that set of devices. This will trigger an update in MSK_2_i2 to MSK_2_(i2+1), i.e., the set key changes and its index increases. Since the group key MTK_2 might be compromised, a new MTK_3 is distributed in a secure way to the devices in the different sets using MSK_1_(i1+1), MSK_2_(i2+1), and MSK_3_i3.

This embodiment can also fit with Solution #1 in [2]. Instead of having to deliver N RRC reconfiguration requests, it is possible to send only M−1 RRC reconfiguration requests updating the new set key. The new group key must be delivered together with the multicast/broadcast traffic, in particular, the new group key is protected with the L set keys of the L sets of UEs. Note that this requires the RAN to be able to include this key information in the multicast/broadcast traffic. Note that if this last requirement is not feasible, the alternative would be to deliver the new group key by means of RRC reconfiguration requests, however, these messages are unicast messages so that a change in the RAN would be required to be able to deliver RRC reconfiguration messages through a broadcast channel.

This solution can be used in the context of Solution #3 in [2]. In this solution, a multicast transport key (MTK) is defined that is generated in the core network (MB-CP). This MTK is distributed in a secure to each UE (in unicast) and it is used to protect the MBS data from MB-UP to UE. If this embodiment is used, multiple set keys are generated in the core network (MB-CP). This set keys are then transported in a secure way to the UEs by means of secure unicast messages. The set keys are then used to update the group key that protect the content key from MB-UP to UE.

An important aspect of this embodiment is about how sets of UEs are defined. An option is to define them according to location. The location might be for instance related to the area covered by a base station or by an antenna beam of a base station or based on the tracking area. This is important since all UEs in that area can receive the content using the same radio resources. A specific example might be in a stadium where multicast/broadcast content (e.g., digital signage, or information about the match) is to be delivered by a base station. To provide the best possible performance, the base station uses multiple radio beams to address different sets of users in the stadium. Other ways to define the sets are feasible, for instance, depending on the features of the UE, depending on the multicast and broadcast services they subscribe to.

Embodiment 2: Facilitating Mobility

In Solution #1 in [2], mobility is open for further specification. If a UE moves to a close by cell, it is important to use the same group key in the delivery of multicast/broadcast content in order to avoid any traffic disruptions. From this point of view, the same group key is used to broadcast the content in surrounding cells. Since the set keys are used to update the group keys, it is recommended to give UEs the set keys associated to set of devices around its location. The risk of not following this recommendation is that when a UE moves to a surrounding cell, the group key might be updated with the set key of that cell, and the UE might miss that message. Alternatively, the base stations might broadcast the updates of the group keys using the set keys of surrounding areas. In this way, if a UE comes from a surrounding area, it will be able to decrypt the new group key. The advantage of this last method is that less key material is given to the UEs reducing the risk of leakage. Another clear benefit is that set keys should be updated when a UE leaves a set of UEs. If a UE has a single set key, then the amount of updates is lower.

Figure 13:
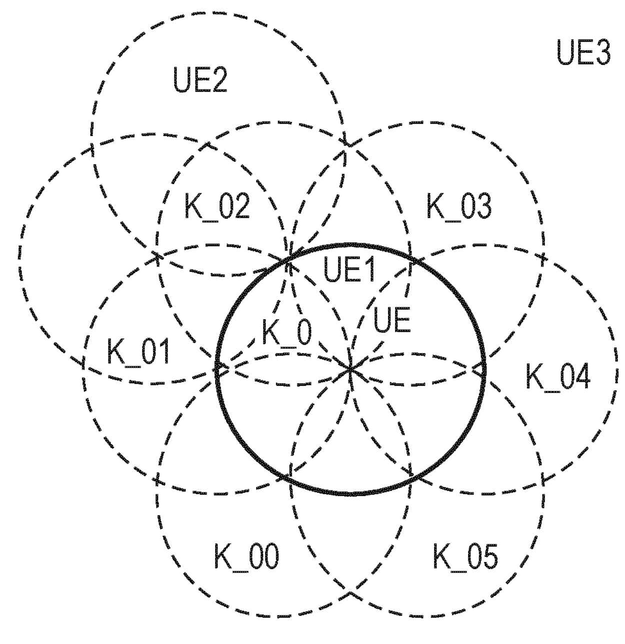
FIG. 13 is a diagram representing a procedure in accordance with a another embodiment of the invention

This is illustrated in FIG. 13 where a UE (e.g., the UE within the bold line circle) might have multiple set keys. In this case, the UE within the bold line circle might have K_0 and K_0i with i={0, . . . , 5}. Alternatively, the UE might only have K_0 and surrounding cells would be broadcasting updates of the group key with surrounding set keys.

We note that an additional benefit of this refers to RAN architectures using a DU/CU split. In such architectures, each distributed unit (DU) might be an independent cell and the central unit (CU) runs the RRC layer of all DUs. An approach might consist in having a different group key per DU to protect the MBS traffic. If a UE leaves a DU, only the UEs in the DU have to be updated. From this point of view, this solution might seem to have a similar performance as having multiple set keys. The difference lies at the CU since the CU that is distributing the MBS traffic to all DU will have to protect the MBS traffic with as many group keys as DUs it handles. With the solution proposed in this invention, each DU will have its own set key used to verify and decrypt the delivery of the group key protecting the MBS data. The CU only has to encrypt the MBS data once, with the group key shared by all DU under its control. When delivering this data, the CU has to include next to the protected MBS traffic the protected group key, protected with each of the set keys assigned to each of the DUs under its control.

Embodiment 3: Keeping in Sync

A UE that is part of the group might miss a key group update. If this happens, the UE might not be able to decrypt the distributed content. To avoid this situation, the currently used key groups are distributed in a proactive manner in a periodic way, in particular, shortly after a key update is performed.

Another important aspect refers to how freshness is ensured. A way of ensuring it is by using time, e.g., UTC time, in the construction of the initialization vector (IV) used in AE. If a counter is used in the IV construction, the IV should be set to an initial value when a new group key is distributed, and it should be increased constantly. A UE should not accept any message with an older IV than the one that it currently has. Since the transport key is shared between all devices, an attacker might also attempt to inject fake traffic. To this end, the attacker has a to use an IV with a higher value. UEs should not accept messages whose IV is much higher, e.g., equivalent to the data transmission of several seconds or minutes, than they currently have. If the IV is constructed by using a UTC based counter, the UE should not accept messages containing an IV that differs more than a small time window from the current time.

Embodiment 4: Ensuring Source Authentication in the Update of the Group Key

A problem encountered in the systems as described till now is that the group key is updated using several set keys (as described in Embodiment 1). This problem also appears in [3] since the MTK is updated using the MSK. Since the set keys (and the MSK in [3]), an attacker might attempt to "fake" an update of the group key. This can lead to the situation in which a set of devices get a wrong group key. The immediate effect is that they will not be able to decrypt the received content and the message authentication code will fail. If on top of it, the attacker manages to inject fake content protected with the previously injected fake group key, the UEs in that set of devices will accept the fake content.

It is proposed two methods to deal with this issue:

METHOD 1: To solve this problem in these systems and in [3], the network can construct an authentication fingerprint of the group key update. This fingerprint is constructed by 1) obtaining a new group key K at random, this key is e.g., 256 bit long and 2) obtaining the hash (e.g., SHA2 or SHA3) of K, i.e., R=HASH(K). When the network broadcast the key update, by distributing the new group key protected with the M set keys (Step h in FIG. 10), the network also appends to that message R.

Upon reception of this group key update message, a UE does the following:

a) It looks for the part of the message including its group key update protected (encryption/integrity) with its set key. The UE checks the message authentication code, the UE checks the freshness of the update message, and if both conditions succeed, the UE decrypts the new group key.

b) It checks whether the hash of the received value R equals the decrypted group key.

In the attack described above, the nodes in a set of nodes will have a successful check for all two above conditions a) and b). However, since the information is sent over a broadcast channel, all devices will receive this message and devices in other sets will not succeed in verifying condition b). Thus, those devices in other sets of devices can trigger an alarm towards the core network indicating the mismatch and including the received message. The network can verify which of the sets is affected/under attack by checking which of the group key updates is wrong.

METHOD 2: In the context of the current study to deal with Fake Base Stations some solutions using digital signatures are being discussed. One of them is the Digital Signing network Function (DSnF). The DSnF is a function that can be used to sign SI, but it can also be used to sign other information. For instance, the group key updates. In this case, message h in FIG. 10 would also be signed by the DSnF. To this end, the network entity generating this message needs to send a request first to the DSnF to get the signature of the message. Then this signature is appended to the group key update. If this is done so, a UE only accepts the decrypted key update if:

1) The verification of the MAC using its set key is correct
2) Freshness check using the counter (as in Embodiment 3) is correct
3) The digital signature is successfully verified.

We note that if the generation and distribution of the group key is done within the RAN (as in Solution #1 in [2]), then the base stations could also append the signature. This might require sending a request to the DSnF first. Or alternatively, using its own public/private key pair, if they own it.

Further, in view of the previous embodiments and variants of the invention, it is proposed to adapt the process described in TR33.850, as follows:

2 DETAILED PROPOSAL

KI#2 in TR 33.850 requires the 5GS to support the confidentiality protection, integrity protection, and anti-replay protection of MBS traffic. KI#3 in TR 23.757 also requires studying: "How can a UE join/leave (including authorised or revoked to access) a multicast communication service?".

Putting in context both key issues, it is possible to encounter risks and threats such as:

- A content key used to protect the 5MBS traffic is used for a long period of time.
- A device in the group leaves and it should be prevented from receiving new content
- A device joins and it should be prevented from having access to old content
- A device in the group is malicious and it should be prevented from injecting fake content The above risks and threats require:

1. adapting an existing key issue or creating a new one requiring that the 5GS is capable to update the keys used to protect multicast content.
2. An efficient solution to distribute and update keys used to protect the content so that these keys can be distributed and updated in an efficient manner.

We ask SA3 to kindly consider including the additional two changes in TR 33.850.

- The first change sets a requirement on the need for key update.
- The second change describes an efficient and resilient method for key distribution and update. For the sake of the explanation this is that in the context of existing solution #2.

Start of Change 1

Key Issue #3: Security Protection of Key Distribution 5.3.1 Key Issue Details

MBS introduces the concept of a point-to-multipoint service into a 3GPP system. MBS traffic is delivered from application service provider to multiple UEs through 5GS. To securely transmit data to a given set of users, the MBS traffic needs to be protected to mitigate the potential attacks. As the security fundamental basis, the keys for protection of MBS traffic are required.

Compared with UE keys, the keys for protection of MBS traffic are one-to-many keys. When UE joins the MBS session, only authorized users are able to receive the keys delivered from the key generator for protection of MBS traffic. UEs might also leave an MBS session or be compromised.

5.3.2 Security Threats

If the keys for protection of MBS traffic are not confidentiality protected, an attacker may use the 3GPP network to gain "free access" of MBS services.

If the keys for protection of MBS traffic are not integrity or anti-replay protected, the authorised users may not be able to acquire the MBS traffic properly.

If the keys for protecting the MBS traffic cannot be updated, then:

- If a device in the group leaves, the device might be able too access the content,
- If a device joins the group, the device might be able to access previous content,
- If a device in the group is malicious, the device might be able to inject fake content.

5.3.3 Potential Security Requirements

The distribution of the keys for protection of MBS traffic between the key generator and the UE shall be confidentiality, integrity and anti-replay protected.

The 5GS shall be able to update the keys for protection of MBS traffic.

End of Change 1

Start of Change 2

Solution #2: Protect MBS Traffic in Service Layer 6.2.1 Solution Overview

This solution addresses Key Issue 2 & 3 to support the secure MBS traffic delivery from context provider to multiple UEs through 5GS. In the baseline architecture 2 in TR 23.757 [2], the MBSU (Multicast/Broadcast Service User plane) is defined as a new entity to handle the payload part to cater for the service level functions and management. Similarly, MSF User Plane (MSF-U) in baseline architecture 1 is also defined in service layer. This solution protects the MBS traffic between the MBSU/MSF-U in the operator domain and the UE. It is independent to the protection in the application layer from the content provider.

The keys for protection of MBS traffic are generated in the SMF. Afterwards, the keys are distributed to UEs and MBSU/MSF-U respectively. The UEs, which belongs to a multicast group, acquire the same keys in the MBSU/MSF-U. The keys can be updated in an efficient way.

6.2.2 Solution Details

Figure 1:
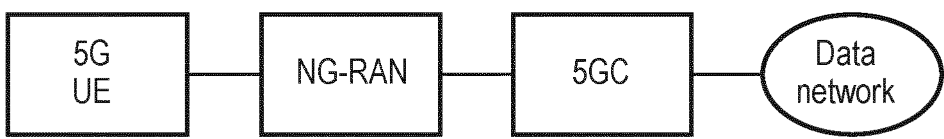
FIG. 1, already described, is a diagram illustrating a High Level MBS architecture.
Figure 2:
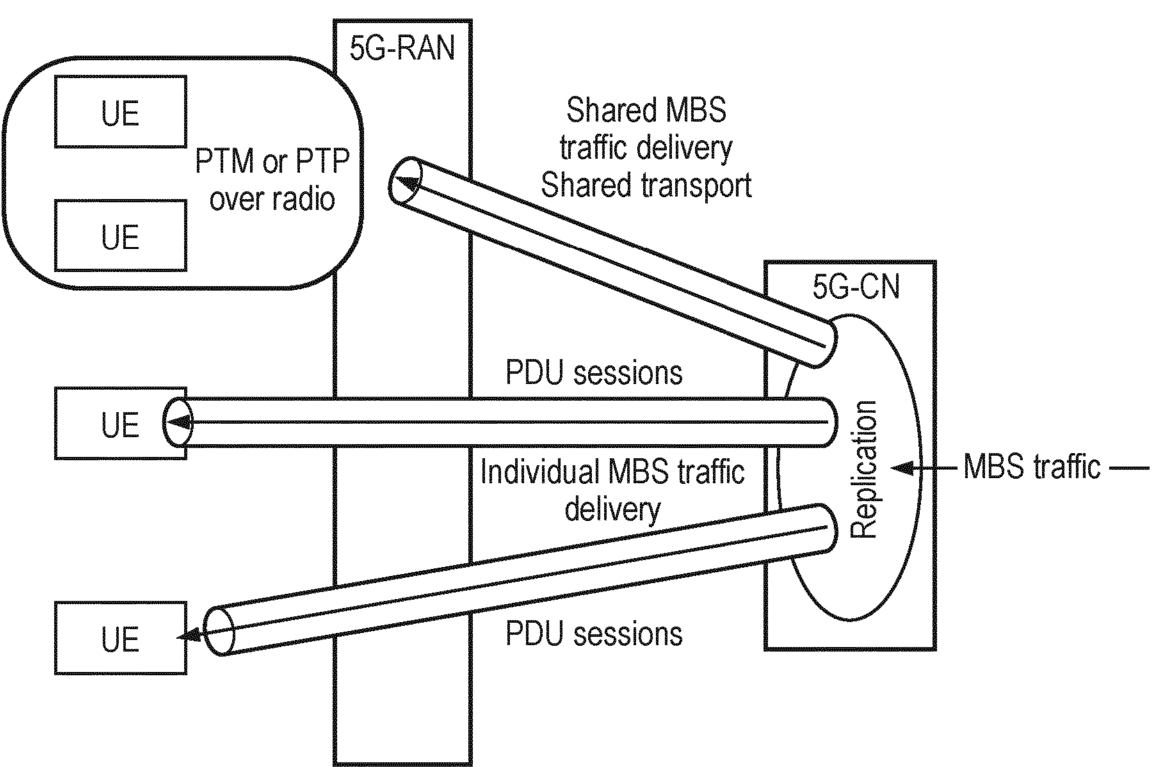
FIG. 2, already described, is a diagram illustrating delivery methods for MBS.
Figure 3:
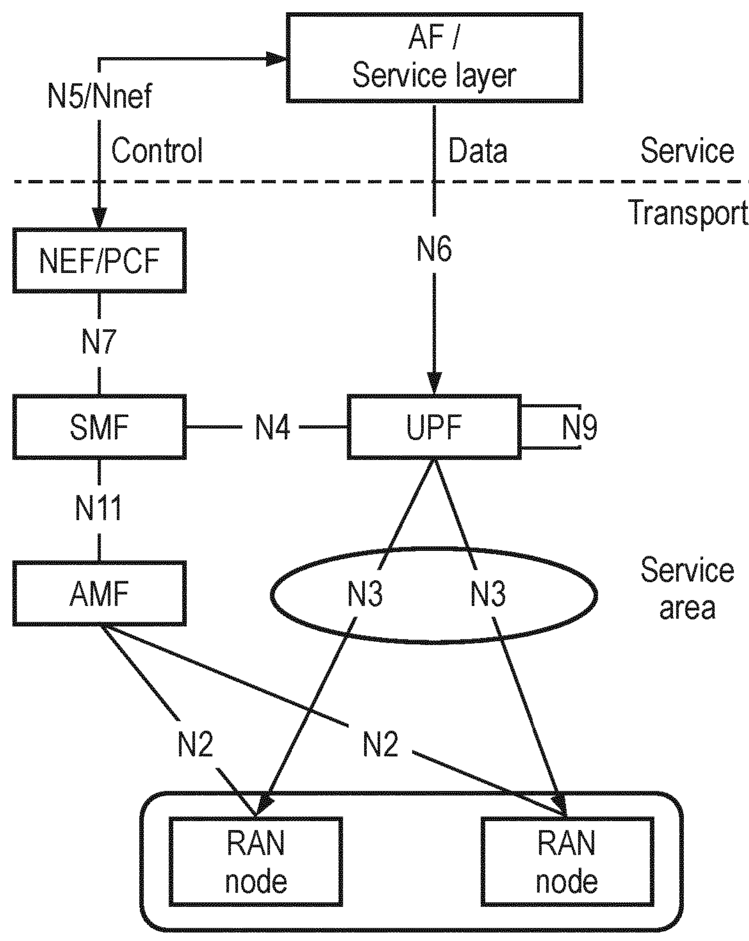
FIG. 3, already described, is a diagram illustrating the 5G system architecture for integrated Multicast transport with unicast.
Figure 4:
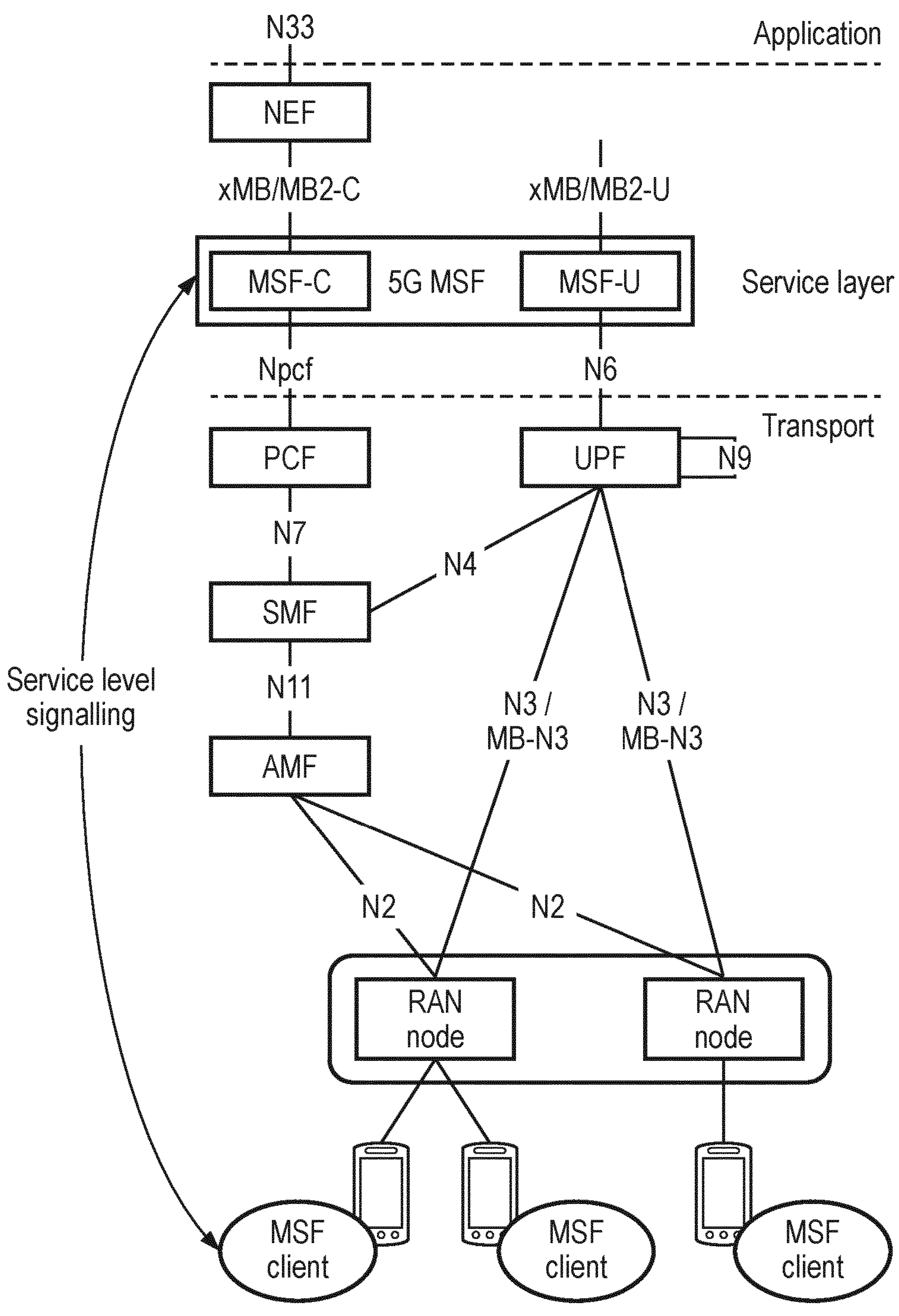
FIG. 4, already described, is a diagram showing an example of service layer support of multicast/broadcast.
Figure 5:
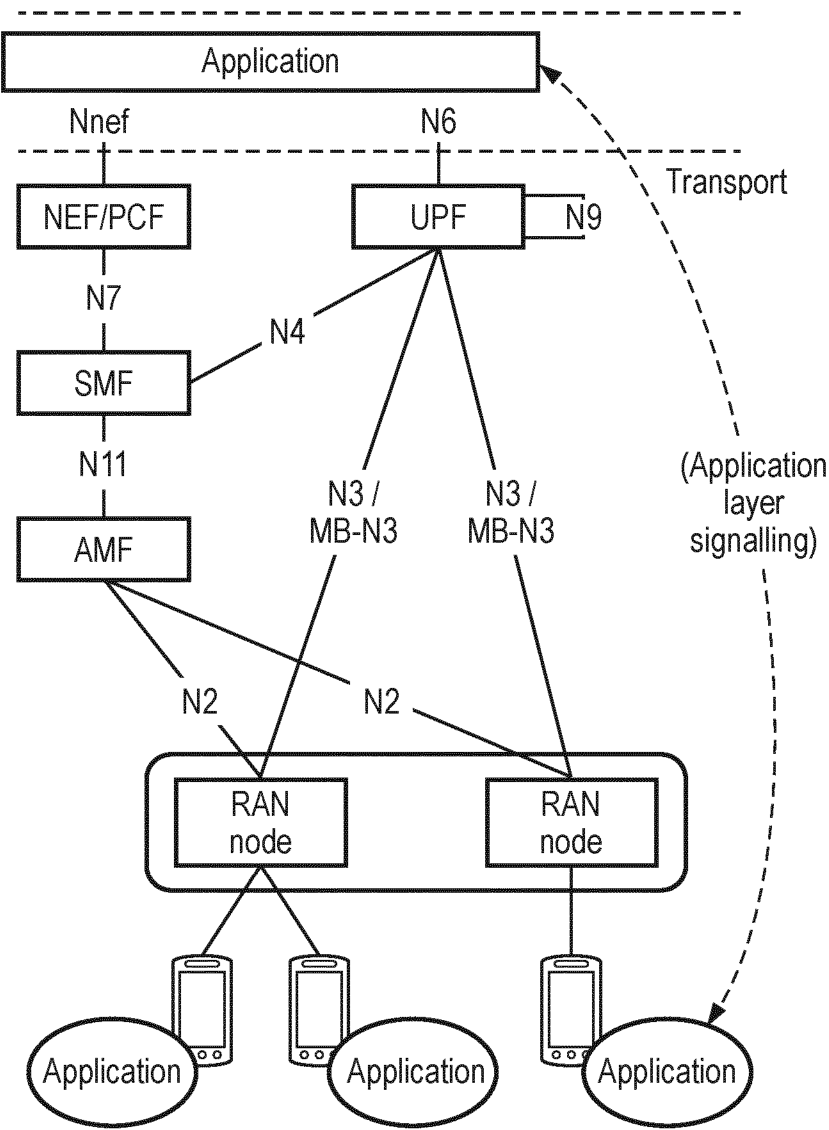
FIG. 5, already described, is a diagram representing an exemplary MBS system with direct interaction with the Application Server.
Figure 6:
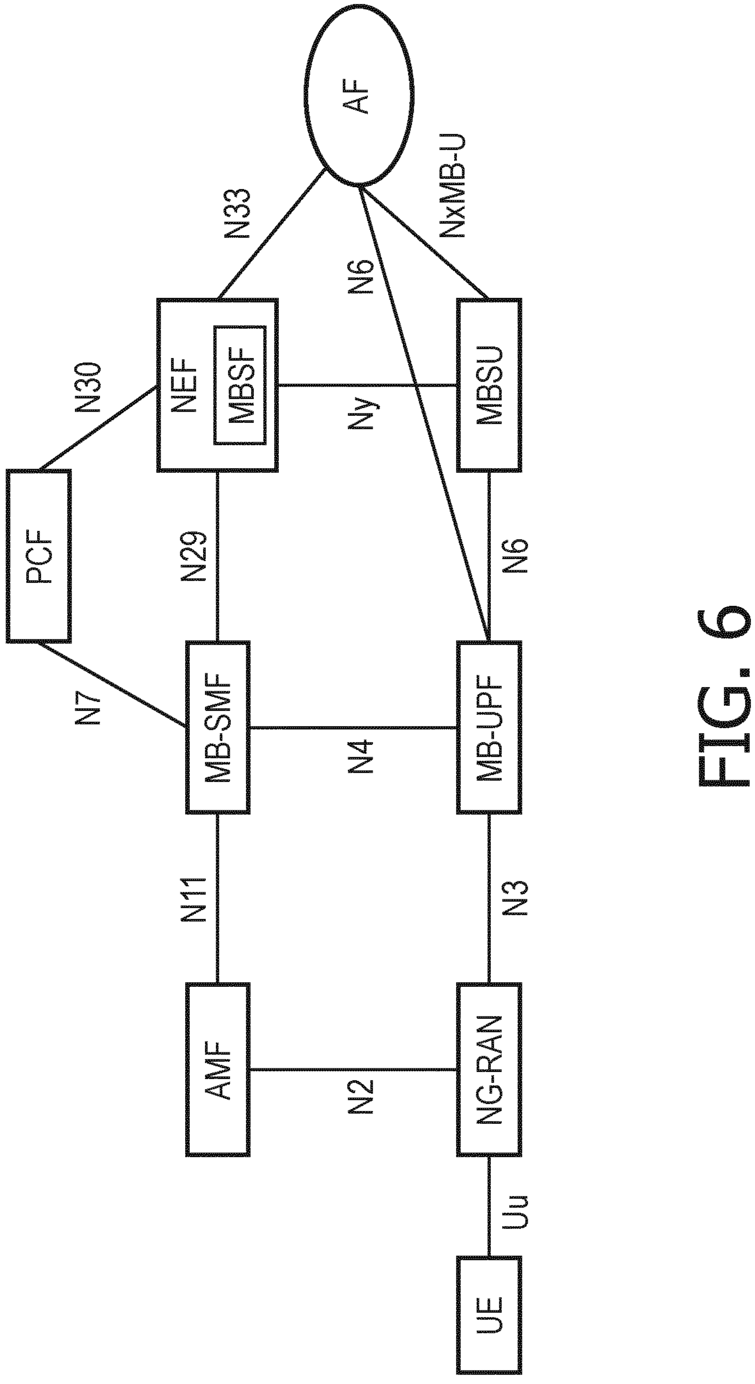
FIG. 6, already described, is a block diagram representing a single exemplary architecture for MBS in 5GS.
Figure 7:
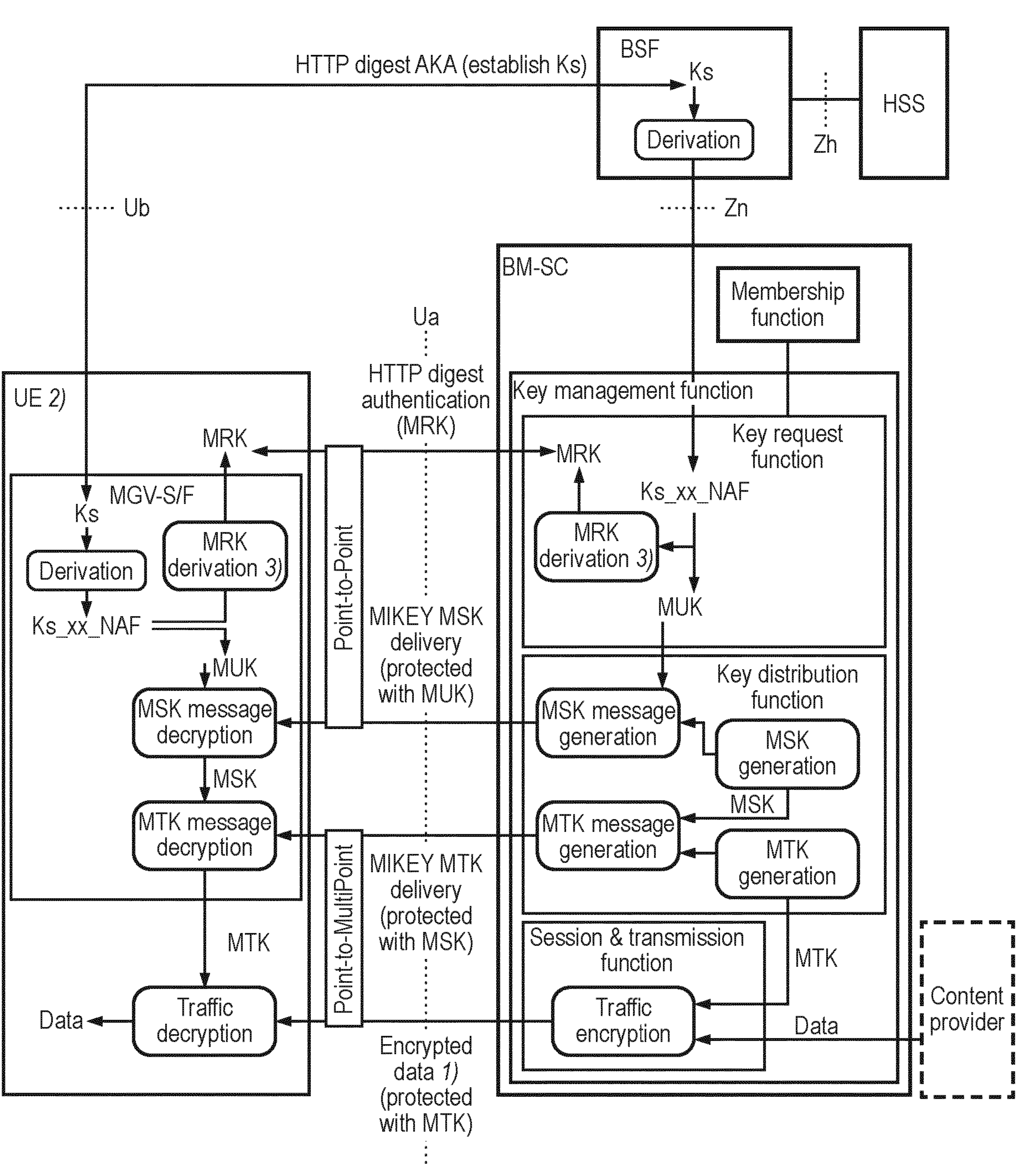
FIG. 7, already described, is a diagram illustrating the overall MBMS security architecture.
Figure 16:
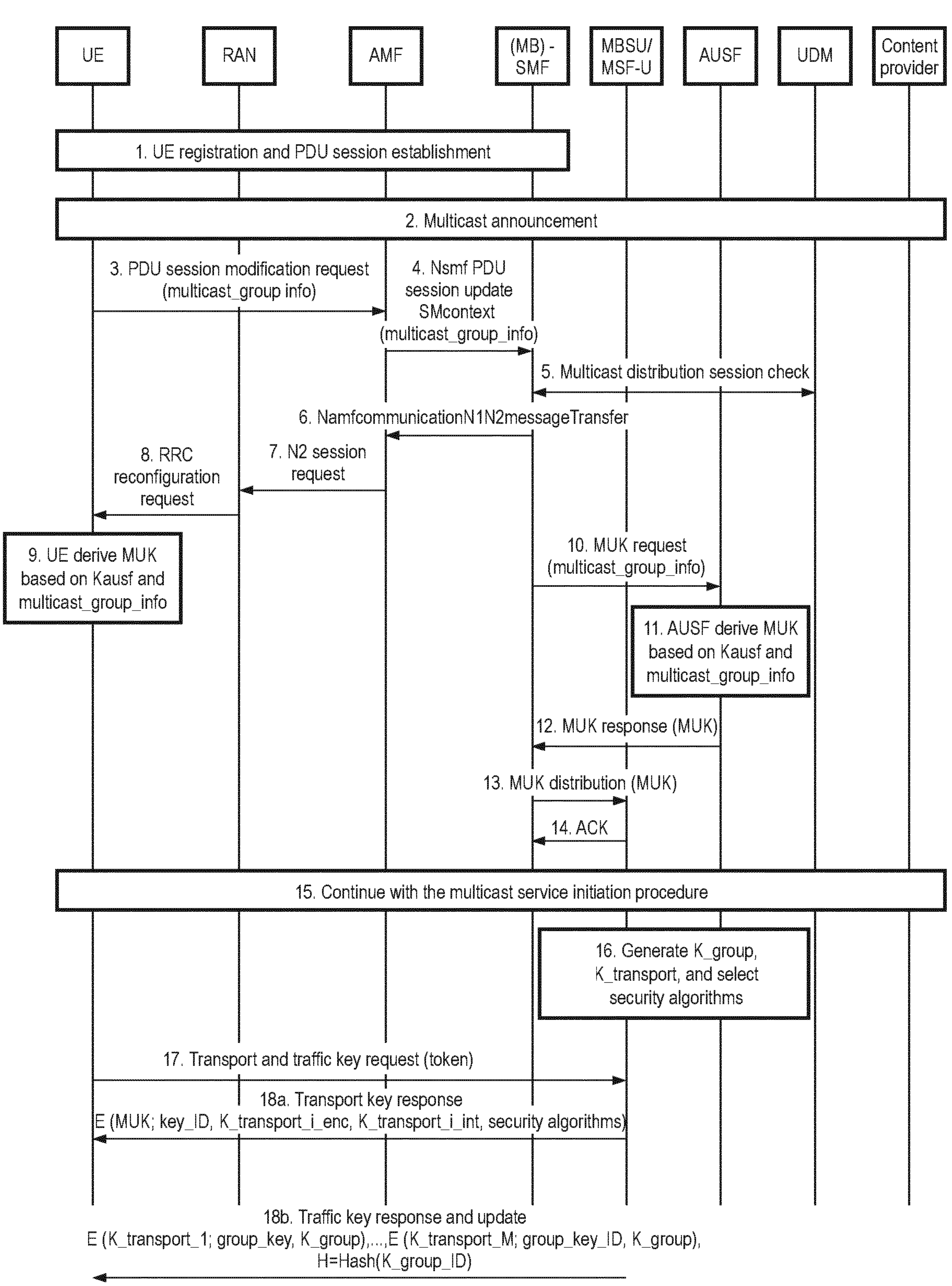
FIG. 16 is a diagram proposed for a change in the 3GPP standard specifications.

Replace FIG. 6.2.2-1. The procedure to protect MBS traffic in service layer as shown in FIG. 16.

The procedure is described as follows:

1. The UE registers 5GS and establishs a PDU session.
2. The content provider announces the availability of multicast using higher layers (e.g., application layer).
3. The UE sends the PDU Session Modification Request. Information about multicast group including identifer of the multicast group which UE wants to join, shall be sent. Multicast_group_ID can be multicast address or other identifier.

4. The AMF invokes Nsmf_PDUSession_UpdateSMContext, in which information about multicast group is included.
   Editor's Note: Step 3 & 4 need to be revised if SA2 agrees to support UE's multicast session join/leave operation UP e.g. IGMP Join/Leave.
5. If MBS context is not available in (MB)-SMF, (MB)-SMF interacts with UDM to check whether a multicast context for the multicast group exists in the system.
6. (MB)-SMF requests the AMF to transfer a message to the RAN node using the Namf_N1N2MessageTransfer service to create a multicast context in the RAN, if it does not exist already. IP address of MBSU/MBS-U may be included if needed for UE to find MBSU/MBS-U,
7. The N2 session modification request is sent to the RAN.
8. RAN sends RRC reconfiguration request message to UE.
9. If UE is allowed to access the MBS service, UE derives Multicast User Key (MUK) from Kasuf and Multicast_group_ID is used as input parameter.
   Editor's Note: MUK derivation is FFS.
   Editor's Note. Key update procedure after reauthenticatiorr is FFS.
10. SMF requests MUK and sends Multicast_group_ID to AUSF.
11. AUSF derives Multicast User Key (MUK) based on Kasuf and Multicast_group_ID.
12. AUSF responds to SMF with MUK.
13. SMF distributes MUK to MBSU/MSF-U.
14. MBSU/MSF-U receives and stores the MUK. Afterwards, ACK is reponded to SMF.
15. Continue with the multicast service initiation procedure.
16. MBSU/MSF-U checks whether the MBS security context for this multicast group is available. MBS security context, which is used for MBS traffic protection, includes the key_ID, K_group_enc, K_group_int, encryption and integrity algorithms. The key_ID is used to indicate which key pair is used. K_group_enc and K_group_int are used for encryption and integrity protection of MBS traffic respectively.
   If not, MBSU/MSF-U generates K_group and derives the K_group_enc and K_group_int. The encryption and integrity algorithms are selected.
17. UE calculates token based on MUK and requests traffic key to MBSU/MSF-U.
   Editor's Note: Token construction is FFS.
18. MBSU/MSF-U verifies the token using MUK and distributes the MBS security context to UE if succeeded.
   Editor's Note: The message name and flow may be updated to align with the conclusion frons SA2 and RAN WGs.
   Editor's Note: Roaming aspect is FFS.

6.2.2.1 MBS Security content for efficient group key distribution and update

This section explains the logic of step 18 in FIG. 6.2.2.1.

A multicast group with N members is divided into M sets S_i with i={1,M}. Each set has roughly L˜N/M UEs. Each UE has three keys: a device specific key, MUK; a transport key K_transport_i shared with other L−1 devices in the same set; a group key shared with all N devices and used to protect the multicast content. The MUK is used to securely deliver transport keys in a point-to-point connection. The transport keys are used to securely deliver the group key in a multicast fashion. The key hierarchy is as follows where the arrow indicates protection.

MUK->K_transport_i->K_group

E{K1;K2} means authenticated encryption of key K2 with key K1 and is used to indicate the secure delivery of keys.

The distribution and update of the group key is done by means of two messages:

Message 18a: a UE receives the key transport for the set it belongs to protected with the UE's MUK.
   A UE first verifies the message authentication code, and if it is correct, it decrypts its transport key. Freshness can be achieved in multiple ways. For instance, an increasing initialization vector can be used that depends on the initial access token exchanged in Step 17.

Message 18b: the new group key is distributed by protecting it with the transport keys in a point-to-point or multicast message. The hash of the group key is included.
   A UE first searches the part of the message that is addressed to ita set. For instance, if the UE belongs to set z, the UE needs to look for E{K_transport_z; K_group}. Then, the UE verifies the message authentication code, and if it is correct, it decrypts the new group key. Freshness can be achieved by using the same freshness counter as used for the distribution of content data. Finally, the UE also checks whether the hash of the decrypted key equals the hash H of the group key that is appended at the end of this message.

These two messages can be combined to address different situations:

1. Initial key distribution to a UE: the UE is provided in the same message combining 18a and 18b its transport key and the group key.
2. Key update triggered by a too long usage of key group: Message 18b is used to distribute a new group key to all UEs.
3. Key update triggered by a new device joining the group: Message 18a is used to deliver the corresponding transport key to the new UE. Then, Message 18b is used to distribute a new group key to all UEs.
4. Key update triggered by a UE leaving/being revoked: If a UE leaves or is revoked, its transport key associated to its set and the group key are compromised. To deal with this situation, Message 18a is sent to the L−1 in its set to update the transport key. Afterwards, message 18b is used to distribute a new group key to all UEs.

This approach is efficient and resilient as follows:

The update of the group key due to a device leaving only requires L−1+M messages instead of N that are required when only point-to-point messages are involved. For instance, if N=1600, M=40, L=40, then key update only requires 39 point-to-point messages for the transport key update and 40 messages for the group key update.

Since M transport keys are used, an attacker that compromises a UE can only try to update the group key of up to L−1 devices. This limits the impact of such an attack, in particular, compared with a situation in which a single key is used transport the group key where N−1 would be affected. Furthermore, the hash of the group key is included to Message 18b so that devices in other sets can check the consistency, detect the attack, and inform the 5MBS. In this sense, this solution is M-resilient.

The following refers to an Editor's note in TR 33.850-040, Solution 2 regarding UE re-authentication. The process during UE re-authentication is as follows:

Step 0: the UE starts the re-authentication process and goes to Step 1.

Step 1: During the re-authentication process:

Step 1.1: the UE attempts to process the incoming protected MBS traffic by using its known group key. If it is successful, it goes to Step 2.

Step 1.2: if the UE cannot process the incoming protected MBS traffic, then the UE tries to access the new group key distributed regularly in messages 18b by using its previous transport key. If the UE is successful, the UE access the new group key and goes to Step 2.

Step 1.3: the UE waits till the delivery of the new transport and group keys. These two keys are delivered by means of messages 18a and 18b. These keys are only delivered if the re-authentication and re-authorization process is successful and are protected with MUK. Once the UE receives them, the UE goes to Step 3 otherwise, it goes to Step 2.

Step 2: the UE is not authenticated or authorized to access the MBS traffic.

Step 3: the UE has the current group and transport key and can access the protected MBS traffic and any group key updates.

We note that Step 1.2 requires that the update of the new group key protected with the set (transport) keys is not protected with the old group key. We note that it is advantageous to not do so when we want to optimize the key update process during UE re-authentication.

We note that the above process is optimized to improve the user experience since a UE can try to access the MBS traffic even before it is re-authenticated by trying to use the group and transport keys that the UE already had. This is what is done in Steps 1.1 and Steps 1.2. If these keys work, the UE can directly access the traffic. If these keys do not work, it might be due to two reasons. The first reason is that the keys were updated due to a regular key update or other UE leaving the multicast group. The second reason is that the UE itself is not allowed anymore and it is not supposed to access the MBS traffic.

We note that if no transport keys are used, Step 1.2 above should be skipped, and Step 1.3 only contains message 18a.

The key hierarchy described in above embodiments uses M different transport keys (K_transport_i) that are used to update the group key. This approach reduces therefore the number of unicast messages/point-to-point interactions required to update the transport key from N to N/M. Then the group key can be updated by sending the new group key protected with M different transport keys. This approach strongly reduces the signaling overhead if the UEs leave or join the MBS group frequently and a security applies requiring the update of the group key in those cases. The reason for this is that if we only had a single transport key (as in the case of LTE), then the transport key would be required to be updated requiring N unicast interactions. Once the transport key is updated, the group key can be distributed, e.g., protected with the new transport key. In contrast, having M transport keys means that N/M−1 unicast messages are required to update the compromised key and M protected group keys need to be distributed through the multicast channel, thus, a total of N/M−1+M keys need to be sent. This equals roughly 2*SQRT(N) when M is roughly SQRT(N). A problem might arise in a setting in which the members of the MBS group are rather static (do not leave or join) and a policy applies requiring a very frequent rotation of the group key. In such a setting, the approach proposed above in the context of Sol#2 in TR33.850 might have a higher overhead because multiple transport keys are used to protect the new group keys. To address this issue, it is possible to apply a slightly more complex key hierarchy that can be seen as a combination of the key hierarchy in MBMS (LTE solution) and the key hierarchy proposed above. In this new key hierarchy, there are M+1 transport keys:

M transport "set" keys (K_transport_i) are as described above, i.e., each of those transport keys is used by a disjoint set of L=N/M UEs.

1 transport "common" key (K_transport_common) that is common to all UEs.

In this setting, if:

The MBS group UE members remain static, and the group key needs to be rotated frequently, then the transport "common" key is used to securely distribute the new group keys. This is secure since the UE members do not change, and thus, all M+1 transport keys remain valid. This is efficient since a single key is used to securely send the updated group key.

The MBS group UE members are dynamic, then L−1 unicast messages are used to update a "compromised" transport "set" key when a UE leaves or joins. Recall that these L−1 messages are protected using the MUK keys that are UE specific. Then the new group key as well as the new transport "common" key are updated by sending those two keys protected with the M transport "set" key through the multicast channel. Alternatively, the new transport "common" key is updated by protecting it with the M transport "set" keys through the multicast channel, and then the new transport "common" key is used to update the new group key, also through the multicast channel.

Figure 15:
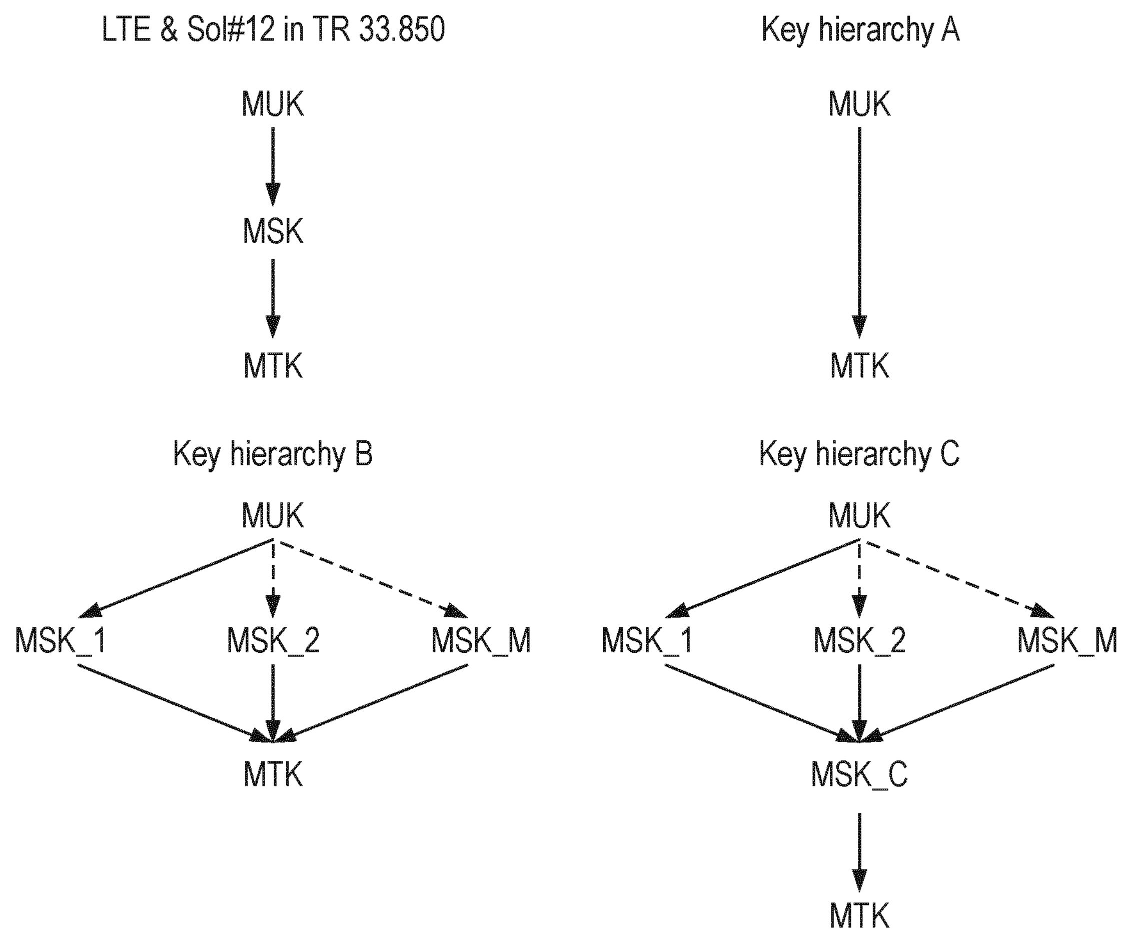
FIG. 15 is a diagram representing different key hierarchies for proposed embodiments of the invention.

FIG. 15 describes relevant key hierarchies. The first one, is the key hierarchy used in LTE, and also in Solution 12 in TR 33.850. Here, each UE has a MUK that is used to securely receive a MSK through a unicast channel. The MSK is common to all UEs and can be used to distribute the MTK, i.e., the group key, to all UEs through the multicast channel. The second one (key hierarchy A) refers to the default solution described above when no transport keys are used. In this key hierarchy updates the MTK directly using UE specific unique keys. The third one (key hierarchy B), there are multiple M MTKs associated to disjoint sets of up to L UEs. A UE uses a device specific MUK to securely receive its MSK. Then all M MSKs are used to distribute the MTK. The fourth one (key hierarchy C) is the key hierarchy described above in which there are M MSKs, each of the bound to a disjoint set of up to L UEs (transport "set" keys) and 1 MSK that is common to all UEs (transport "common" key). The key hierarchies in FIG. 15 are applicable, e.g., to Sol#12 in TR 33.850 or other service layer solutions in that 3GPP study.

The entity protecting the MBS traffic, e.g., a NF or a number of NFs interacting with each other would manage the key hierarchy and a policy in charge of determining how frequently the keys are to be updated and under which circumstances:

regular key update of the group key, including, e.g., frequency or maximum usage.

regular key update of the transport "common" key, including, e.g., frequency or maximum usage.

update of a transport "set" key when a UE leaves or joins.

update of the transport "common" key and/or group key when a UE leaves or joins.

In TR 33.850 the authentication and authorization is within scope of Key issue #1. The protection of the MBS traffic is within the scope of key issue #3. In above solution, the process for re-authentication depends only on the implementation of Solution 2, however, (re-) authentication will be handled as part of a different solution. For instance, in TR 33.850-040, Solution 6 performs authentication and authorization for multicast communication service. Solution 6 does so based on K_AKMA. In particular, a key K_MBS is derived from K_AKMA and used for authentication and authorization. In other solutions, e.g., Solution 2, a device key MUK is used for the delivery of the group key. In this case, MUK is derived from K_ausf. The problem address next is about how to put together solutions in TR 33.850 that address different key issues (e.g., KI #1 and KI#3) but that in the end need to work together.

To address this issue, it is required that keys for authentication/authorization and keys used for the delivery of key updates are described in a related key hierarchy. In an embodiment addressing this issue, this is done as follows:

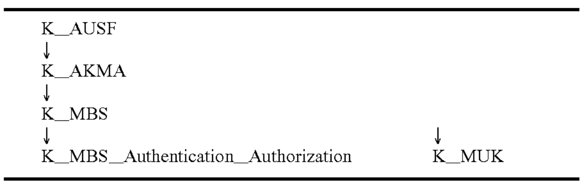

K_AKMA is derived from K_AUSF as described in 3GPP TS 33.535 16.0.0 Release 16. K_AKMA is then used to derive a master K_MBS key for a UE and a given MBS service. From this K_MBS key, two keys are derived. The first key, K_MBS_Authentication_Authorization is used for the authentication and authorization procedure, e.g., in Solution 6 in TR 33.850. This means that in Solution 6, an additional key derivation step is missing from K_MBS. The second key, K_MUK, is used in the delivery of the group key used to protect the multicast traffic. This K_MUK appears, e.g., in Solution 2, and it means that Solution 2 should be modified to derive K_MUK from K_MBS and K_AKMA instead of deriving it directly from K_AUSF. We note that when deriving some of above keys, e.g., K_MUK, a counter c can be used as input to the key derivation function to obtain multiple K_MUKs within the current authentication and authorization session.

An alternative to above key hierarchy is the following one:

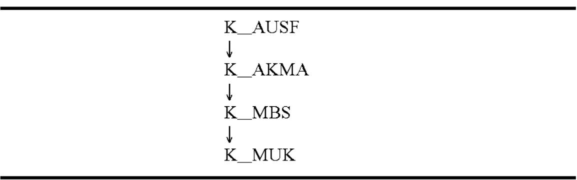

The difference here is that K_MUK (used in Solution 2) is derived from K_MBS (used in Solution 6). In particular, K_MUK can be derived from K_MBS, information exchanged during the authentication and authorization process, and a counter c. The counter allows deriving multiple K_MUK in case that the key needs to be rotated within the current authentication and authorization session.

We note that if a UE re-authenticates, the above key hierarchy does not describe whether K_MUK should change. It is an option to trigger the update of K_MUK in case of re-authentication. This can be done by means of the counter c described above.

We note that in the case of UE re-authentication, the MUK might also need to change even if the key hierarchy K_AUSF→MUK is kept as in Solution 2. The main reason is that the reauthentication might trigger the update of K_AUSF itself. TS 33.501-A.2 describes the process for K_AUSF generation, and it depends, e.g., on the serving network name. If this happens, keeping the same MUK as proposed in proposal S3-210919 submitted to 3GPP SA3 #102-e-Bis, might cause synchronization issues. For instance, assume that a UE joined the MBS service by authenticating and generating a first MUK key. The UE then IDLE for a long time. At a later time, the UE rejoins triggering its reauthentication. However, assume that either the UE or the core network might have deleted the old MUK, e.g., because of the long time the UE was IDLE. If only one of the parties has removed the old MUK, that party will generate a new one. However, the new MUK will not match the old MUK if K_AUSF has changed because of the re-authentication process, e.g., if the UE joined through a different serving network. In general, and independent of Solution 2, the device key used to distribute the transport key or the group key, should be updated after (re-)authentication.

Next to K_MUK, if a UE is using a solution using set keys (or transport keys), the corresponding set key might also require an update. The same could hold for the group key used to secure the MBS traffic.

However, doing so might incur in high signaling overhead. In general, a better approach is to keep independent (i) the keys used for authentication/authorization and distribution of set keys/group keys and (ii) the set keys and MBS group key. In particular, set keys and MBS group key might only need to be updated if the re-authentication process of a UE fails.

The solution presented here can be considered as an in-band key update mechanism. However, some solutions split the control and user planes. The control plane is used for the delivery of updates of the key group and the user plane is in charge of the delivery of multicast traffic. This split appears for instance in Solution 8 in TR 33.850-040. In this solution, the (MB)-SMF solution is in charge of generating a group key (MTK) and the corresponding key identifier (KID). This key and identifier are shared later within the core network with MBSF-U. This key and identifier are shared later with the UE through the control channel. The content provider delivers multicast data to the MBSF-U that is in charge of distributing it over the user plane to all UEs connected to the service. This is done by protecting the multicast data with the group key.

In the event of a key update, all N UEs subscribed to the service need to get a key update. As discussed throughout this document, this can involve many communication resources, not only because each and every UE needs to be informed, but also because each and every UE should also confirm the proper reception of the key update.

The ideas in this embodiment can be applied to improve this solution involving a split of user and control MBS planes as well. When the group key is scheduled, the following is done:

Step 1, the (MB-)SMF generates a new group key.

Step 2, if a UE has left the MBS, has been revoked, etc. the (MB-)SMF also generates a new set key corresponding to the set of devices that UE belonged to. The (MB-)SMF distributes the new set key—which will be used to securely transport the new group key—through the control plane to the (M−1) devices in the set. This message is equivalent to message 18a in Solution 2 in TR 33.850.

Step 3, the (MB-)SMF shares with the MBSF-U the new group key (as in the current description) and a key update message in which the new key group is protected with the L set keys. This is equivalent to message 18b in Solution 2 in TR 33.850.

Step 4, when the MBSF-U receives this key update, the MBSF-U first distributes the key update, i.e., the new group key protected with the L set keys (equivalent to message 18b in Solution 2 in TR 33.850), by sending this information in band together with the regular multicast content. This information is therefore protected with the current group key. This can be done multiple times to make sure that UEs receive this key update.

Step 5, the MBSF-U can switch to the usage of the new group key.

In an extension of above procedure, when UEs get a key update message in step 4, the UEs might also inform the (MB-)SMF of the reception of such key update. In this extension, the (MB-)SMF will wait till most of the UEs have confirmed the reception of the key update or a timer times out, and then inform the MBSF-U about this event that triggers the switch of the group key (step 5 above).

If previous extension is applied, in Step 3 might only consist of the key update message and the delivery of the new group key can be delayed till the moment in which the (MB-)SMF informs the MBSF-U that most UEs have received the key update.

If previous extension is applied, "most of the UEs" means a given percentage of the N UEs subscribed to the MBS service, e.g., 99% of the UEs. For the remaining UEs, the (MB-)SMF might opt for a direct connection through the control channel. Similarly, "a timer times out" means that the MBSF-U has been distributing the key update message for a long enough period of time, and the UEs that have not confirmed the reception of the message should be contacted directly through the control channel.

We note that this split applies to the delivery of the set keys (or transport keys) that are delivered through the control channel and the delivery of the group key that is delivered in band through the user plane. This can be done in this solution for any parameters (N, M, L), in particular, it can be done if there is a single set/transport key.

In SA3#102-e-Bis, proposal S3-210857 provides a framework for secure key distribution. This framework defines inputs and outputs to two key derivation functions generating two broadcast keys for encryption and integrity protection, namely KMTentt and KMTint. The inputs to each of the KDFs include 1) Rekeying token, 2) Multicast Group Token, 3) Algorithm identifier, and 4) Temporary Mobile Group Identifier (TMGI). The network provides the UE with the 2) and 4) in a secure manner, in particular, by means of a secure RRC message. The UE and RAN can then generate the same KMTentt and KMTint. If re-keying is required, the network can provide the UE with a re-keying token so that both UE and RAN can generate new multicast keys KMTentt and KMTint. It is to be noted that in this solution, Element 2) Multicast Group Token plays the role of a master multicast key. This parameter should therefore be generated in a secure way and be long enough. This proposal S3-210857 can also benefit of the method described in this application to reduce the amount of signaling messages. In particular, if new multicast keys need to be generated by the UEs, this proposal S3-210857 requires the sending of N secure messages to each and every of the UEs including the new rekeying token. Although the rekeying token does not require confidentiality protection, it does require integrity protection. Instead of sending N integrity protected messages, the N UEs might be divided into M=N/L sets of devices. Each set of devices has a different set or transport key. These transport keys are used to the delivery of above elements when required for those sets of devices that have remained unchanged. This delivery is done in a multicast manner. If a set of devices has changed (a new UE has joined/left), then new transport keys and any of above elements can be delivered by means of RRC protected messages.

We note that in this solution, if a UE leaves the group, the leaving UE knows the Multicast Group Token, that acts as a master key. A way of applying the method described in this description to this solution is to use different rekeying tokens per base station. If different rekeying tokens are used (i.e. the rekeying material is function of the base station), then only the rekeying token of the base station from which the UE left needs to be updated. Otherwise, if the same rekeying token were used in all base stations, then a UE leaving the MBS group when located at a specific base station would force the 5GS to update all UEs in all base stations. This is not efficient and involves more signaling overhead.

In this particular solution (and also S3-210857 and other solutions in which the MBS encryption and integrity keys are updated through the control channel), once the rekeying token is sent through multiple RRC messages to the UEs, then the new K_MT_enc and K_MT_int should be used. There might be an interval of time in which the old K_MT_enc and K_MT_int keys and the new ones might need to be active. When the base stations start using the new MBS encryption and integrity keys, the base stations (or the entity protecting and sending the MBS traffic) might indicate this key switch to the UEs by including in the multicast data (user plane) the identifier of the MBS encryption and integrity keys. Alternatively, the base stations might use and flip a single bit in the multicast data channel to indicate the switch from the old to the new keys.

We note that this proposal S3-210857 has two design flaws since it states in message 8 in FIG. 6.X.2.2-1 and message 7 in 6.X.2.3-1 that the RRC messages are encrypted. The proposal does not mention integrity protection. In case of message 8, encryption is needed for the distribution of element 2). However, integrity protection is also a must since otherwise, it is possible to modify the message and deny the service to the UE. In case of message 7, the requirement is also integrity protection and freshness. If element 1) is a counter, the counter could be public, but the receiving party needs to be able to verify its integrity and freshness.

We note that, in this proposal S3-210857, if 1) is a counter, a UE that has been revoked might still be able to access MBS traffic even if the counter changes since the UE only needs to update its counter. Therefore, the rekeying token must be long enough (e.g., 128 bits or longer) and must be generated at random. A shorter rekeying token (e.g., 32 bits or 64 bits) is not enough since an attacker can precompute keys in advance and then pick up the right key when the rekeying token is distributed. An attacker might also be able to record the traffic and decrypt at a later point of time.

In SA3#102-e-Bis, proposal S3-211144 provides another solution for the generation of MBS keys. This solution is similar to S3-210857 since the MBS encryption and integrity keys are derived from a master key from a number of parameters including a counter and a random value instead of distributing new keys on demand. As in the case of S3-210857, this solution can also benefit of the method described in this application to reduce the amount of signaling messages. For instance, set of keys might correspond the UEs receiving the MBS service through a specific base station. Devices in the same set share a set or transport key. When the MBS encryption and integrity keys (KMRB-int and KM RB-enc in FIG. 6.X.2.1-1 in S3-211144) need to be updated in all UEs in a base station, the base station delivers the parameters required to update KMRB-int and KMRB-enc, e.g., RANDMBS and CountMBS, through the multicast channel MRB (PTM). These parameters are protected with the corresponding transport key.

Next to this, we would like to note that S3-211144 assumes a key hierarchy in which KMBS is the master key delivered to RAN. From this key, gNB specific keys are generated as follows: KMBS-RAN=KDF {KMBS, TMGI, RANDMBS, CountMBS, PCI, ARFCN-DL}

The usage of PCI and ARFCN-DL bind a key to a specific RAN cell. However, this also has a big drawback, namely that if a UE leaves the MBS group or is revoked, the keys in all base stations delivering the MBS traffic need to be updated. This leads to a big signaling overhead. This is because the same master key is used for all base stations delivering a given MBS service. This can be improved in several ways in this case as well as in other systems:

Each base station generates a different gNB specific key KM BS-RAN at random.

The key hierarchy includes an intermediate level, for example between RAN and KMBS, related to the tracking area. This intermediate key KMBS-TA is specific for a tracking area and aims at reducing the impact of a key update.

The UE instead of receiving KMBS receives only the gNB specific key KM BS-RAN or an intermediate key, e.g. KMBS-TA in messages 5 and 11 in FIG. 6.a.2.1-1 in S3-211144.

We note that if the UE does not have access to the master MBS key, the mobility (handover) procedures should be modified such that a UE is informed of the target MBS RAN key or target MBS TA key.

It is to be noted that since (i) $K_{MBS-RAN}$ is computed as KDF{$K_{MBS}$, TMGI, $RAND_{MBS}$, $Count_{MBS}$, PCI, ARFCN-DL}, (ii) $K_{MBS-RAN}$ only depends on $RAND_{MBS}$ security-wise if a UE leaves a group, and (iii) only the $K_{MBS-RAN}$ of the gNB with a leaving/revoked UE needs to be updated, then K_MBS is not needed. The same applies to the Multicast group Token in proposal S3-210857.

Furthermore:

1. This solution is fundamentally equivalent to a solution that securely distributes $RAND_{MBS}$ (key for RAN) directly to the UEs as in equation (0) to derive from it K_MRB-int and K_MRB-enc as described according to (1), (2), (3).

$$RRC(RAND_{MBS}, TMGI, Count_{MBS}, PCI, ARFCN\text{-}DL) \quad (0)$$

In this approach, the UE receives and check all other parameters, individually, namely TMGI, $Count_{MBS}$, PCI, ARFCN-DL. Alternatively, $K_{MBS-RAN}$ can also be distributed directly.

2. A similar solution can be obtained if we compute the parameters as follows:

$$K_{MBS-RAN}=KDF\ \{TMGI, RAND_{MBS}, CountMBS, PCI, ARFCN\text{-}DL\} \quad (1)$$

$$K_{MRB-enc}=KDF\ \{K_{MBS-RAN}, \text{Algorithm type distinguisher value, Algorithm identifier value}\} \quad (2)$$

$$K_{MRB-int}=KDF\ \{K_{MBS-RAN}, \text{Algorithm type distinguisher value, Algorithm identifier value}\} \quad (3)$$

In (1), K_MBS is removed compared with the current text in S3-211144 since the security does not depend on it.

3. In another alternative solution, we could also skip a KDF operation and compute $K_{MRB-enc}$ and $K_{MRB-int}$ as (4) and (5):

$$K_{MRB-enc}=KDF\ \{TMGI, RAND_{MBS}, Count_{MBS}, PCI, ARFCN\text{-}DL, K_{MBS-RAN}, \text{Algorithm type distinguisher value, Algorithm identifier value}\} \quad (4)$$

$$K_{MRB-int}=KDF\ \{TMGI, RAND_{MBS}, Count_{MBS}, PCI, ARFCN\text{-}DL, K_{MBS-RAN}, \text{Algorithm type distinguisher value, Algorithm identifier value}\} \quad (5)$$

Where all parameters are distributed to the UEs by means of message (0).

In (1), (4), and (5), PCI could be removed since the message is distributed in RRC message coming from that specific base station.

In SA3#102-e-Bis, proposal S3-210918 provides another solution for the generation of MBS keys that is somewhat similar to Solution 8 in TR 33.850. In this new solution MBSF-C generates the new group key (MTK2) that is distributed to MBSF-U and (MB)-SMF. (MB)-SMF is in charge of delivering this new key to the UEs by means of unicast signalling messages. Once it is done, the (MB)-SMF notifies the MBSF-U. After this notification, MBSF-U starts using this key MTK2 to protect the MBS data. This solution can benefit of the described embodiments to reduce the signaling overhead. In particular, the MBSF-C or (MB)-SMF might distribute UEs into sets, each set linked to a respective transport key. The new group key MTK2 can thus be distributed to the UEs protected with this transport keys over the multicast stream and still protected with the old MTK2 key. When the UEs receive an update, the UEs notify the (MB)-SMF that will keep track of all UEs that are aware of the new key. For those UEs that have not responded, the (MB)-SMF could use a unicast key update modification as proposed in S3-210918. Once the (MB)-SMF has ensured that most of the UEs registered to the MBS traffic have received the new MTK2 key, the (MB)-SMF sends a MTK activation notification to the MBSF-U.

We note that proposal S3-210918 assumes a unidirectional link in step 6, key update notification, going from (MB)-SMF to UE. This is likely not enough since the UEs might miss the signaling message, and this might cause disruption in the reception of the MBS data. We note that the current proposal might require a policy at the (MB)-SMF describing how to handle when a certain percentage of UEs have not confirmed the reception of the key update notification message. In particular, this policy might include a relative or absolute number of UEs that might have not confirmed the reception of the message before the MTK activation notification is sent to MBSF-U. This policy might also include a timer that triggers the sending of this notification if the timer expires. This policy might also define how UEs not confirming the key update notification should be managed, e.g., how many times this message should be transmitted.

In SA3#102-e-Bis, proposal S3-211070 provides another solution for the generation and distribution of MBS keys and MBS traffic. This solution relies on three keys: MUK (device specific key), MSK, and MTK. The MUK is used to distribute the MSK in a unicast message over a secure connection. The MTK is protected by means of the MSK. The MTK can be delivered in a unicast or multicast message. The MTK—or keys derived from it—is used to protect the MBS data. This proposal S3-211070 is similar to the ideas disclosed in this filing. The main difference is that S3-211070 seems to include a single MSK. S3-211070 can profit of the ideas in this filing if UEs in a MBS service are divided into M sets, each using a different MSK. To this end, it is required that the delivery of the multicast traffic key contains the MTK encrypted with the different MSKs. This solution uses a key hierarchy for the derivation of MUK from KAF with AKMA, as previously described in this filing (KAUSF->KAKMA->KMBS (KAF)->MUK).

These apparatuses may be implemented by a program code means of a computer program and/or as dedicated hardware of the related devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

REFERENCES

[1] TR 23.757 v1.0.0
[2] TR 33.850 v0.2.0
[3] TS 33.246-g00 3 (MBMS security)
[4] itectec.com

The invention claimed is:

1. A method for a primary station to distribute a cryptographic key to a plurality of secondary stations, the method comprising the steps of:
- determining whether a group key needs to be updated, said group key being used for multicast protected communication from the primary station to the plurality of secondary stations, and
- upon determining that an update is required, transmitting to at least a subset of the secondary stations through an encrypted message an updated cryptographic key,
- wherein the updated cryptographic key is a first set key shared to a first set of secondary stations that allows encrypting multicast messages addressed to the first set of secondary stations, and
- wherein the encrypted message is sent in unicast.

2. The method of claim 1, wherein the updated cryptographic key is an updated group key, and wherein the encrypted message is encrypted by means of a user specific encryption key and sent in unicast.

3. The method of claim 1, wherein determining whether a group key needs to be updated includes determining whether at least one of the following conditions is satisfied: at least one of the secondary stations' access rights have been revoked, at least one of the secondary stations' access rights have expired, a validity time of the group key has expired, at least one of the secondary stations has moved away from a predetermined location.

4. The method of claim 1, wherein the first set key is updated upon determination that the access rights of at least one of the secondary stations belonging to the first set are not currently valid.

5. The method of claim 4, further comprising the step of transmitting an updated group key to each set of secondary stations by means of a message protected with a respective set key associated to each set of secondary stations.

6. The method of claim 4, further comprising the step of transmitting an updated group key to at least a first and a second sets of secondary stations by means of a multicast message containing at least a first and a second protected group keys, wherein the first protected group key is protected with a first set key associated to the first set of secondary stations and the second protected group key is protected with a second set key associated to the second set of secondary stations.

7. The method of claims 4, wherein the multicast message includes along with the protected updated group key an authentication fingerprint message that allows checking whether the integrity of the decrypted group key.

8. The method of claim 1, wherein multicast messages are retransmitted periodically.

9. A program code means of a computer program stored/distributed on a non-transitory computer readable medium, the non-transitory computer-readable medium comprising instructions adapted to, when executed on a computer, cause the computer to perform the steps of the method claimed in claim 1.

10. A method for a primary station to distribute a cryptographic key to a plurality of secondary stations, comprising the steps of:
- determining whether a group key needs to be updated, said group key being used for protected multicast communication from the primary station to the plurality of secondary stations, and
- upon determining that an update is required, transmitting in respective multicast messages to respective sets of secondary station an updated group key, said multicast messages being protected by means of respective set keys associated with each corresponding set,
- wherein the updated cryptographic key is a first set key shared to a first set of secondary stations that allows encrypting multicast messages addressed to the first set of secondary stations, and
- wherein the updated cryptographic key is sent in unicast.

11. The method of claim 10, wherein determining whether a group key needs to be updated includes determining whether at least one of the following conditions is satisfied:
- at least one of the secondary stations' access rights have been revoked,
- at least one of the secondary stations' access rights have expired,
- a validity time of the group key has expired,
- at least one of the secondary stations has moved away from a predetermined location.

12. The method of claim 10, further comprising, upon the determination that the group key is linked to access rights of a first secondary station belonging to a first set of secondary stations not being valid, transmitting to each secondary stations of said first set through protected unicast message a new first set key by unicast.

13. The method of claim 12, further comprising transmitting in a multicast message to the first set of the secondary stations an updated group key, said multicast message being encrypted by means of the new first set key, and wherein the protected unicast message also includes the updated group key.

14. The method of claim 10, wherein the sets of secondary stations are formed based on location, and the method further comprises the primary station transmitting in at least one further multicast message the updated group key, said further multicast message being encrypted by means of a respective set key used in a neighbouring set, and wherein the neighbouring set is a set of a plurality of secondary stations camping in a cell served by another primary station.

15. The method of claim 10, wherein the multicast message includes along with the updated group key an authentication fingerprint message computed as the hash of updated group key.

16. A method for a primary station to distribute a cryptographic key to a plurality of secondary stations, comprising the steps of:

determining whether a group key needs to be updated, said group key being used for protected multicast communication from the primary station to the plurality of secondary stations, upon determining that an update is required, transmit to at least one first subset of the secondary stations through a protected unicast message a first set key by unicast, wherein the updated cryptographic key is a first set key shared to the first set of secondary stations that allows encrypting multicast messages addressed to the first set of secondary stations, transmitting in a multicast message to the first set of the secondary stations an updated group key, said multicast message being protected by means of the first set key, or alternatively including said updated group key in the protected unicast message, and transmitting in respective multicast messages to further respective sets of secondary station the updated group key, said multicast messages being protected by means of respective set keys associated with each corresponding set, and wherein the updated cryptographic key is sent in unicast.

17. A method for a secondary station receiving a cryptographic key in a network, comprising the steps of:

receiving from the primary station through protected unicast message a first set key by unicast, said first key being associated with a first set of secondary stations, and receiving and decrypting a multicast message to the first set of the secondary stations an updated group key, said decrypting using the first set key, wherein the updated cryptographic key is a first set key shared to a first set of secondary stations that allows encrypting multicast messages addressed to the first set of secondary stations, and wherein the updated cryptographic key is sent in unicast.

18. The method of claim 17, wherein the multicast message includes along with the protected updated group key an authentication fingerprint message, and the method further comprising the secondary station authenticating the multicast message by checking whether the hash of the decrypted group key matches the received authentication fingerprint, and the method further comprising reporting an anomaly to the primary station if the check fails.

19. The method of claim 17, wherein the multicast message comprises at least a first and a second protected group keys, wherein the first protected group key is protected with a first set key associated to the first set of secondary stations and the second protected group key is protected with a second set key associated to the second set of secondary stations, and wherein receiving and decrypting the multicast message comprises:

determining, by the secondary station, the set of secondary stations it belongs to, determining, by the secondary station, the protected group key associated to the set of secondary stations the secondary station belongs to, and decrypting, by the secondary station, the determined protected group key using the set group key.

20. A primary station operating in a cellular network and communicating with a plurality of secondary stations, comprising:

a controller adapted to determine whether a group key needs to be updated, said group key being used for protected multicast communication from the primary station to the plurality of secondary stations, and a transmitter coupled to the controller adapted to, upon determining that an update is required, transmit in respective multicast messages to respective sets of secondary station an updated cryptographic key, said multicast messages being protected by means of respective set keys associated with each corresponding set, wherein the updated cryptographic key is a first set key shared to a first set of secondary stations that allows encrypting multicast messages addressed to the first set of secondary stations, and wherein the updated cryptographic key is sent in unicast.

21. A secondary station operating in a cellular network and communicating with a primary station, comprising a receiver adapted to receiving from the primary station through a protected unicast message a first set key by unicast, said first key being associated with a first set of secondary stations, and a controller adapted to decrypt a multicast message to the first set of the secondary stations an updated group key, said decrypting using the first set key, wherein the updated cryptographic key is a first set key shared to a first set of secondary stations that allows encrypting multicast messages addressed to the first set of secondary stations, and wherein the updated cryptographic key is sent in unicast.

* * * * *